United States Patent [19]
Yoshimura et al.

[11] Patent Number: 5,159,856
[45] Date of Patent: Nov. 3, 1992

[54] AUTOMATIC TRANSMISSION LINE PRESSURE CONTROL SYSTEM

[75] Inventors: Hiroshi Yoshimura; Masahito Kitada, both of Hiroshima; Koichiro Takeuchi, Hatsukaichi; Junichi Doi, Hiroshima, all of Japan

[73] Assignee: Mazda Motor Corporation, Hiroshima, Japan

[21] Appl. No.: 764,687

[22] Filed: Sep. 24, 1991

[30] Foreign Application Priority Data

Sep. 28, 1990 [JP] Japan .................... 2-261075
Jun. 17, 1991 [JP] Japan .................... 3-144784

[51] Int. Cl.⁵ .................................................. B60K 41/06
[52] U.S. Cl. ................................................... 74/867
[58] Field of Search ................................. 74/856, 867

[56] References Cited

U.S. PATENT DOCUMENTS

| | | | |
|---|---|---|---|
| 3,942,393 | 3/1976 | Forster et al. | 74/867 X |
| 4,283,970 | 8/1981 | Vukovich | 74/866 |
| 4,831,896 | 5/1989 | Sakakiyama | 74/856 |
| 4,870,877 | 10/1989 | Hasegawa et al. | 74/869 |
| 5,070,747 | 12/1991 | Lentz et al. | 74/867 X |
| 5,079,970 | 1/1992 | Butts et al. | 74/867 X |
| 5,085,105 | 2/1992 | Wakahara et al. | 74/866 |
| 5,086,668 | 2/1992 | Fujiwara et al. | 74/867 X |
| 5,092,199 | 3/1992 | Goto et al. | 74/867 X |

FOREIGN PATENT DOCUMENTS 49-30051 8/1974 Japan .
61-48021 10/1986 Japan .

Primary Examiner—Rodney H. Bonck
Assistant Examiner—Ryan W. Massey
Attorney, Agent, or Firm—Fleit, Jacobson, Cohn, Price, Holman & Stern

[57] ABSTRACT

An automatic transmission line pressure control system controls line pressure in an automatic transmission equipped with a torque convertor for hydraulically coupling and uncoupling friction coupling elements of the automatic transmission. The automatic transmission line pressure control system regulates line pressure for selectively coupling and uncoupling the friction coupling elements so as to shift the automatic transmission into desired speed gears. The line pressure is forcibly dropped to a level lower than a level present before an occurrence of a manual shift-down operation when a shift-down sensor detects the occurrence of a manual shift-down. The line pressure is then raised as a speed sensor detects an increase in rotational speed transmitted the automatic transmission, thereby shifting the automatic transmission into desired speed gears.

10 Claims, 17 Drawing Sheets

FIG. 3

| GEAR POSITION | CLUTCH | | | BRAKE | | | LOW & REVERSE |
|---|---|---|---|---|---|---|---|
| | FORWARD | COAST | 3-4 | 2-4 | | | |
| | | | | BAND | S/A | S/R | |
| D₁ | ○ | × | × | × | × | × | × |
| D₂ | ○ | × | × | ○ | ○ | × | × |
| D₃ | ○ | ○ | ○ | × | ○ | ○ | × |
| D₄ | ○ | × | ○ | ○ | ○ | × | × |
| S₁ | ○ | × | × | × | × | × | × |
| S₂ | ○ | × | × | ○ | ○ | × | × |
| S₃ | ○ | ○ | ○ | × | ○ | ○ | × |
| L₁ | ○ | × | × | × | × | × | ○ |
| L₂ | ○ | ○ | × | ○ | ○ | × | × |

| PATTERN \ Nt | 0 | 750 | | 5250 | 6000 |
|---|---|---|---|---|---|
| 4→3 | PLo | — | | — | — |
| 4→2 | — | — | | — | — |
| 3→2 | — | — | | — | — |
| OTHERS | — | — | | — | — |

| TREV−TREV₀ | UNDER 0 | 500 | 1000 | 1500 | 2000 | OVER 2500 |
|---|---|---|---|---|---|---|
| BPRS1 | 4 | 4.5 | 5 | 5.5 | 6 | 6.5 |

| FIG. 12A | FIG. 12B | FIG. 12C | FIG. 12D |

| RANGE | P | R | N | | D | | | | S | | | L | |
|---|---|---|---|---|---|---|---|---|---|---|---|---|---|
| | | | ← | → | 1st | 2nd | 3rd | 4th | 1st | 2nd | 3rd | 1st | 2nd |
| 1ST SOLENOID VALVE | × | × | × | ○ | × | ○ | ○ | ○ | × | ○ | ○ | × | ○ |
| 2ND SOLENOID VALVE | ○ | × | ○ | × | ○ | ○ | × | × | ○ | ○ | × | ○ | ○ |
| 3RD SOLENOID VALVE | ○ | ○ | ○ | × | ○ | ○ | × | ○ | ○ | × | × | × | × |

AUTOMATIC TRANSMISSION LINE PRESSURE CONTROL SYSTEM

The present invention relates to a pressure control system for an automatic transmission which controls or regulates the line pressure in the automatic transmission so as to couple and release or uncouple friction coupling elements of the automatic transmission.

BACKGROUND OF THE INVENTION

1. Field of the Invention

Typically, an automatic transmission for an automotive vehicle comprises a hydraulic torque converter and a multi-speed shift mechanism. The torque converter reduces or multiplies the engine output torque and transmits it to its turbine shaft. The multi-speed shift mechanism shifts the transmission into desired speeds or gears so as to further reduce and transmit the engine output torque to rear wheels of the vehicle. The multi-speed shift mechanism also reverses the rotation of the turbine shaft of the torque converter and transmits it to the rear wheels.

A multi-speed shift mechanism typically comprises a planetary gear set, various friction clutch elements for coupling and releasing the turbine shaft from various gears of the planetary gear set and various friction brake elements for braking specific gears of the planetary gear set so as to shift transmission gear ratios. The coupling or engagement of these friction clutch elements and friction brake elements is selectively controlled by regulating the line pressure in the automatic transmission by a hydraulic pressure control system.

2. Description of Related Art

Some automatic transmissions of this kind, such as the transmission described in Japanese Patent Publication No. 61-48021, have a line pressure control map of predetermined line pressures according to shift patterns and engine loads. However, since the engine load is basically unchanged during shifting, the line pressure is kept unchanged for the same shift pattern. Consequently, it is difficult to develop a line pressure suitable for an engine operating condition during shifting. This causes an abrupt coupling of the friction coupling elements, which generates large shift shocks in the automatic transmission, particularly during down-shifting.

Experience has shown that during proper down-shifting, the engine must be able to raise its speed rapidly and with high response at the beginning of down-shifting. Thereafter, the engine must change the coupling speed of the frictional elements of the automatic transmission by modifying the coupling force in accordance with the engine output torque. It is considered desirable for proper operation to gradually raise the line pressure as the turbine speed of the torque convertor increases. However, it is somewhat difficult, with an automatic transmission line pressure control system providing such a control, to provide a proper line pressure. This is because during down-shifting, for example, from a third speed gear to a second speed gear, caused by a manual change of transmission range while the accelerator pedal is released, a line pressure, suitably developed for the turbine speed, has a pressure value corresponding to the engine load which is higher than a line pressure developed when the accelerator pedal is released. For this reason, it is considered desirable to set the line pressure to an ordinary line pressure, developed when no shifting is present, without using a line pressure setting map, which is ordinarily used to determine a line pressure in the automatic transmission according to turbine speeds, only when down-shifting is caused by a manual change of the transmission range. However, because the normal line pressure is set to a pressure suitable for transmitting the engine brake torque at a turbine speed after shifting, even when the engine is subjected to no engine load or the accelerator pedal is fully released, the line pressure does not correspond to a turbine speed during shifting and, therefore, is set relatively high. Accordingly, in this case, it is difficult to properly develop the line pressure.

Furthermore, in the automatic transmission, during up-shifting, for instance, from a second speed gear to a third speed gear, the line pressure in the automatic transmission is varied by the hydraulic pressure control system so as, on one hand, to release a 2-4 brake element and, on the other hand, to couple or engage a coast clutch element. As is well known, the 2-4 brake element typically comprises a brake band equipped with a servo piston, and is tightened when a hydraulic pressure is supplied to an apply port of the 2-4 brake element only and is released when a hydraulic pressure is supplied both to the apply port and a release port of the 2-4 brake element. Since the 2-4 brake element is under a hydraulic pressure at the apply port while the automatic transmission is placed in the second speed ratio, it is necessary, during up-shifting from the second gear ratio to the third gear ratio, to apply a hydraulic pressure to the release port of the 2-4 brake element so as to release the 2-4 brake element and, simultaneously, to apply a hydraulic pressure to the coast clutch element so as to engage or couple the coast clutch element. For this reason, pressure lines connected to the release port of the 2-4 brake element and the coast clutch element, respectively, are connected to an output port of a shift control valve.

SUMMARY OF THE INVENTION

It is, therefore, a primary object of the invention to provide an automatic transmission line pressure control system which can properly control a line pressure, even during down-shifting caused by manual shifting of the automatic transmission, so as not to generate shift shocks in the automatic transmission.

It is another object of the invention to provide an automatic transmission line pressure control system which permits the automatic transmission shift itself with high responsiveness.

These objects are accomplished by providing an automatic transmission line pressure control system for controlling line pressure in an automatic transmission equipped with a torque convertor for hydraulically coupling and uncoupling friction coupling elements of the automatic transmission. The automatic transmission line pressure control system comprises a line pressure regulating means for regulating line pressure for selectively coupling and uncoupling the friction coupling elements so as to shift the automatic transmission into desired speed gears. The line pressure regulating means is caused to forcibly drop the line pressure to a level lower than a level before an occurrence of a manual shift-down operation when a shift-down sensor means detects the occurrence of a manual shift-down. The line pressure is then raised as a speed sensor detects an increase in rotational speed transmitted to the automatic transmission, thereby shifting the automatic transmission into desired speed gears.

According to the automatic transmission line pressure control system of the present invention, the line pressure is forcibly dropped during a manual shift-down below a line pressure at the beginning of the down-shift and is kept relatively low, so that the engine can raise its speed with high responsiveness at the beginning of the down-shift. This results in a rapid rise of engine speed and reduced shift shocks in the automatic transmission.

BRIEF DESCRIPTION OF THE DRAWINGS

The above and other objects and features of the invention will be apparent to those skilled in the art from the following description of preferred embodiments when considered in conjunction with the accompanying drawings, in which:

FIG. 3 is a table showing operation of friction coupling elements of the automatic transmission of FIG. 2;

DETAILED DESCRIPTION OF THE PREFERRED EMBODIMENTS

Figure 1:
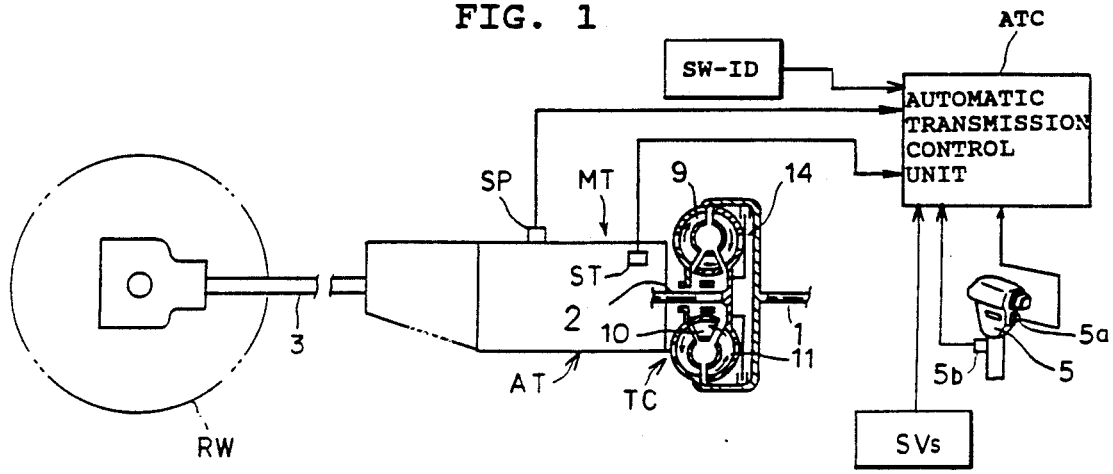
FIG. 1 is an overall schematic illustration of a power train including an automatic transmission line pressure control system, according to a preferred embodiment of the present invention.
Figure 2:
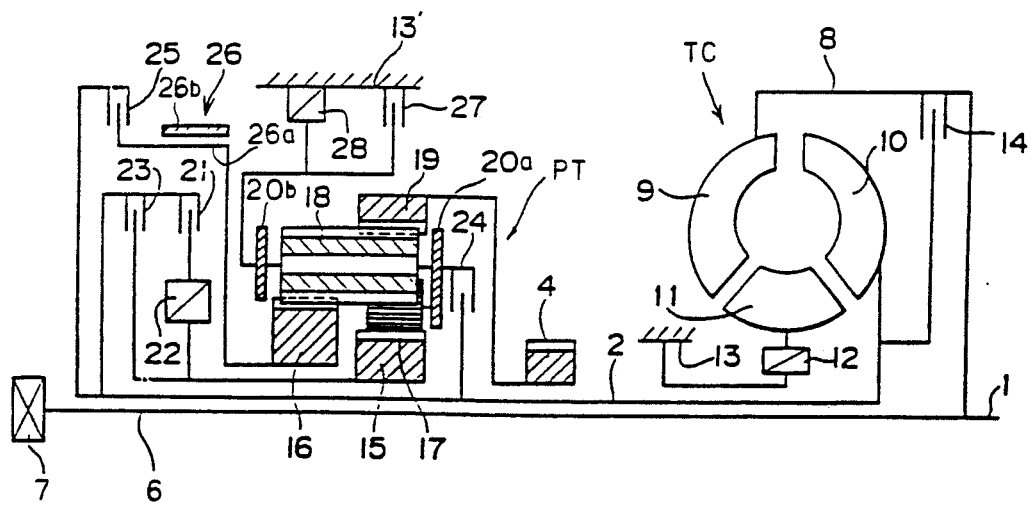
FIG. 2 is a view schematically illustrating the automatic transmission of the power train of FIG. 1.

Referring to the drawings in detail and, in particular, to FIGS. 1 and 2, an automatic transmission AT equipped with a line pressure control system in accordance with a preferred embodiment of the present invention is shown. The control system includes a hydraulic torque converter TC and a multi speed gear ratio transmission, such as a four-speed (i.e., a four forward speed and one reverse speed) transmission MT. The multi speed gear ratio transmission MT is connected to rear wheels RW by means of a propeller shaft 3. The hydraulic torque converter TC, which may be of any known type, comprises a pump or impeller 9 connected to an engine output shaft 1, such as an engine crankshaft, a turbine 10 directly connected to a converter output shaft or transmission input shaft 2, and a stator 11. The transmission input shaft 2 is hollow, and the engine output shaft 1 passes through the hollow transmission input shaft 2. The engine output shaft 1 is connected to an intermediate shaft 6, provided with an oil pump 7. The torque converter TC is provided therein with a lockup clutch 14 between the pump (impeller) 9 and turbine 11. When the lockup clutch 14 is actuated, the pump (impeller) 9 and turbine 11 are mechanically locked together.

The automatic transmission AT is provided with a turbine speed sensor ST, for detecting the speed of rotation of the turbine 11 of the torque converter TC and providing a speed signal, and a shift pattern sensor SP, for detecting shift patterns of the automatic transmission At and providing a shift pattern signal. These signals are sent to an automatic transmission control unit ATC. A shift lever 5 has a hold switch 5a which, when actuated, provides the automatic transmission control unit ATC with a hold signal for fixedly holding the automatic transmission AT in a third speed (3rd) gear ratio when the shift lever 5 selects a drive range (D), wherein shifts automatically occur among all of the four forward speeds, in a second speed (2nd) gear when the shift lever 5 selects a second range (S), wherein shifts automatically occur among the first three forward speeds, or in a first speed (1st) gear when the shift lever 5 selects a low range (L), wherein shifts automatically occur between the first two forward speeds. These ranges are detected by a range sensor 5b provided in association with the shift lever 5. The automatic transmission control unit ATC receives a signal representative of vehicle speed provided from a vehicle speed sensor SV and a signal representative of idling provided from an idle switch SW-ID installed in connection with a throttle valve of the engine. The idle switch SW-ID closes to provide an idle signal when the throttle valve is fully closed. Both the vehicle speed sensor SV and idle switch SW-ID are well known and readily available.

The multi-speed gear ratio transmission MT, comprising a well known type of planetary gearset PT, is coaxially mounted on the transmission input shaft 2. The planetary gearset PT comprises a small diameter sun gear 15, a large diameter sun gear 16, a short length pinion gear 17 in mesh with the small diameter sun gear 15, a long length pinion gear 18 in mesh with both the large diameter sun gear 16 and short length pinion gear 17 and a ring gear 19 in mesh with the long length pinion gear 18. The multi-speed gear ratio transmission MT further comprises various friction coupling elements or means, such as clutch means and brakes means. On one side of the planetary gearset axially remote from the torque converter TC there are disposed forward clutch means 21 with a first one-way clutch 22 and coasting clutch means 23. The forward clutch means 21 is disposed between the transmission input shaft 2 and the small sun gear 15 so that the turbine output transmitted from the turbine shaft 10 is connected to or cut off from the small sun gear 15 through the one-way clutch 22. The coast clutch means 23 is disposed parallel to the forward clutch means 21 between the transmission input shaft 2 and the small sun gear 15 so as to connect or disconnect power between the transmission input shaft 2 and the small sun gear 15. The first one-way clutch 22 functions to prevent the transmission input shaft 2 from turning in the reverse direction.

Radially outside the coast clutch means 23 there is disposed a 2-4 brake means 26, comprising a brake drum 26A coupled to the large sun gear 16 and a brake band 26B encircling the brake drum 26A. The 2-4 brake means 26 functions to stop the large sun gear 16 when the brake band 26B is tightened. On one side of the 2-4 brake means 26, axially remote from the engine, there is disposed a reverse clutch means 25 which connects or disconnects power between transmission input shaft 2 and the large sun gear 16 through the brake drum 26A. Radially outside the planetary gearset PT there is further disposed a low-reverse brake means 27 between a rear carrier 20b of the planetary gearset PT and a casing 13 of the multi-gear speed shift mechanism MT so as to lock and unlock the rear carrier 20b and the casing 13. Between the rear carrier 20b of the planetary gearset PT and the casing 10a of the multi-gear speed shift mechanism MT, there is also disposed a second one-way clutch means 28 parallel to the low-reverse brake clutch means 27. On another side of the planetary gearset PT, axially close to the engine, there is disposed a 3-4 (third speed gear to fourth speed gear) shift clutch means 24 between the transmission input shaft 2 and a front carrier 20a so that the turbine output transmitted through the transmission input shaft 2 is connected to or shut off from the front carrier 20a of the planetary gearset PT. An output gear 4, which is disposed on the other side of the planetary gearset PT, is coupled to the ring gear 19 through an output shaft 8. These clutch means and brake means are selectively actuated as shown in FIG. 3 to place the multi-gear speed shift mechanism MT in any desired speed range. In the table shown in FIG. 3, the clutch means and brake means are coupled or tightened in ranges indicated by circles and released in ranges which are marked by the character "x".

Describing the clutch and brake operation in detail, in the park range (P) and neutral range (N), all of the clutch and brake means 21 and 23 to 27 are released so that the output torque from the transmission input shaft 2 is shut off from the multi-gear speed shift mechanism MT.

In the reverse range (R), the reverse clutch means 25 and the low-reverse brake means 27 are coupled or engaged and the remaining clutch means and brake means 21, 23, 24 and 26 are released. Since the low-reverse brake means 27 is coupled, the second one-way clutch 28, disposed in parallel with the low-reverse brake means 27, performs no function. The first one-way clutch 22 is brought out of the path of torque transmission and performs no function.

In the drive range (D), when the automatic transmission AT is shifted into the first (1st) speed gear range or ratio, the forward clutch means 21 only is coupled. The first and second one-way clutches 22 and 28 are locked up and slip during coasting. While the automatic transmission AT is placed in the first (1st) speed gear ratio in the drive range (D), the output torque from the transmission input shaft 2 is connected to the small sun gear 15, in order, through the forward clutch means 21 and the first one-way clutch 22. Since the second one-way clutch 28 holds the rear carrier 28b stationary, a gear train is provided, in order, by the small sun gear 15, the short pinion gear 17, the long pinion gear 18 and the ring gear 19 in mesh with one another. Accordingly, the gear train transmits the input torque from the small sun gear 15 to the ring gear 19 and, hence, to the output gear 4, so as to reduce the input torque at a large reduction ratio defined by the gear ratio between the small sun gear 15 and ring gear 19. The ring gear 19 and, hence, the output gear 4 rotate in the same direction as the small sun gear 15 and the turbine 10 so as to drive the wheels RW in a forward direction of rotation to move the vehicle forward. During coasting, since the first one-way clutch 22 is not locked and slips, no engine braking is effected.

When the automatic transmission AT is shifted into the second (2nd) speed gear, the forward clutch means 21 and the 2-4 brake means 26 only are coupled. The first one-way clutch 22 is always locked, except during coasting. The second one-way clutch 28 always slips. While the automatic transmission AT is placed in the second (2nd) speed gear in the drive range (D), the large sun gear 16 is held stationary, so as to allow the long pinion gear 18 to turn about its own axis and move around the large sun gear 16. The output torque from the transmission input shaft 2 is connected to the small sun gear 15 basically through the same path as when the automatic transmission AT is placed in the first (1st) speed gear. However, since the ring gear 19 undergoes a larger number of rotations, due to the number of revolutions of the long pinion gear 18, when the transmission is placed in the second (2nd) speed gear as opposed to when the transmission is in the first (1st) speed gear, the reduction ratio defined by the gear ratio between the small sun gear 15 and ring gear 19 is slightly smaller at the second (2nd) speed gear than at the first (1st) speed gear. During coasting, since the first one-way clutch 22 is not locked and slips, no engine braking is effected.

When the automatic transmission AT is shifted into third (3rd) speed gear, the forward clutch means 21, the coast clutch means 23 and the 3-4 clutch means 24 are coupled. Since the coast clutch means 23 is coupled, the forward clutch means 21 and first one-way clutch 22, disposed in parallel with the coast clutch means 23, does not perform its function. The second one-way clutch 28 always slips. While the automatic transmission AT is placed in the third (3rd) speed gear in the drive range (D), the small sun gear 15 and carriers 20a and 20b are interlocked through the transmission input shaft 2 and 3-4 clutch means 24. The planetary gearset PT, with its elements 15 to 20 fixed together, rotates as a whole, so that the output gear 4 is directly coupled to the transmission input shaft 2. Accordingly, the output torque from the transmission input shaft 2 is connected to the output gear 4 without any reduction, i.e., at a reduction ratio of one (1). Because the output gear 4 rotates in the same direction as the transmission input shaft 2, the wheels RW are driven in the forward direction of rotation. At the third (3rd) speed gear in the drive range (D), engine braking is effected.

When the automatic transmission AT is shifted into the fourth (4th) speed gear, the forward clutch means 21, the 3-4 clutch means 24 and the 2-4 brake means 26 are coupled. The first and second one-way clutches 22 and 28 are not locked and slip. Because neither one-way clutch 22 nor one-way clutch 28 is locked, the forward clutch means 21, although being coupled, does not perform its function.

While the automatic transmission AT is in the fourth (4th) speed gear in the drive range (D), the torque from the transmission input shaft 2 is transmitted to the carrier 20a through the 3-4 clutch means 24 and then to the output gear 4 through the long pinion gear 18 and the ring gear 19. Since the 2-4 brake means 26 holds the large sun gear 16, the long pinion gear 18 is allowed to turn about its own axis and move around the large sun gear 16. Accordingly, the speed of rotation of the ring gear 19 is made higher, by the rotation of the long pinion gear 18 about its own axis, than the speed of rotation of the carrier 20a. Hence, the rotation speed of the ring gear is higher than that of the transmission input shaft 2, so as to place the multi-speed gear ratio transmission MT in an over-drive (speed increase) condition. Because the output gear 4 rotates in the same direction a the transmission input shaft 2, the wheels RW are driven in the forward direction of rotation.

In the second range (S), when the automatic transmission AT is shifted into the first (1 st) speed gear, the frictional coupling elements operate in the same way as they do in the drive range (D) at the first (1 st) speed gear.

When the automatic transmission AT is shifted into the second (2nd) speed gear, the forward clutch means 21 and the coast clutch means 23 only are coupled. Because the coast clutch means 23 is coupled, the forward clutch means and first one-way clutch 21 and 22, which are disposed parallel to the coast clutch means 23, do not perform their functions. The torque is transmitted at the second (2nd) speed gear in the second range (S) basically in the same way as at the second (2nd) speed gear in the drive range (D). However, since the first one-way clutch 22 does not perform its function, engine braking is effected.

When the automatic transmission AT is shifted into the third (3rd) speed gear, the frictional coupling elements operate in the same way as they do at the first (1st) speed gear in the drive range (D).

In the first range (L), when the automatic transmission AT is shifted into the first (1st) speed gear, the forward clutch means 21, the coast clutch means 23 and the low reverse brake 27 are coupled. Because the coast clutch means 23 is coupled, the forward clutch means 21 and the first one-way clutch 22, which are disposed in parallel with the coast clutch means 23, do not perform their functions. Further, because the low reverse brake 27 is coupled, the second one-way clutch 28, which is disposed in parallel with the low reverse brake 27, does not perform its function. The torque is transmitted at the first (1st) speed gear in the second range (S) basically in the same way as it is at the first (1st) speed gear in the drive range (D). However, since the first and second one-way clutches 22 and 28 do not perform their functions, engine braking is effected.

When the automatic transmission AT is shifted into the second (2nd) speed gear, the frictional coupling elements operate in the same way as they do at the second (2nd) speed gear in the second range (L).

Figure 4:
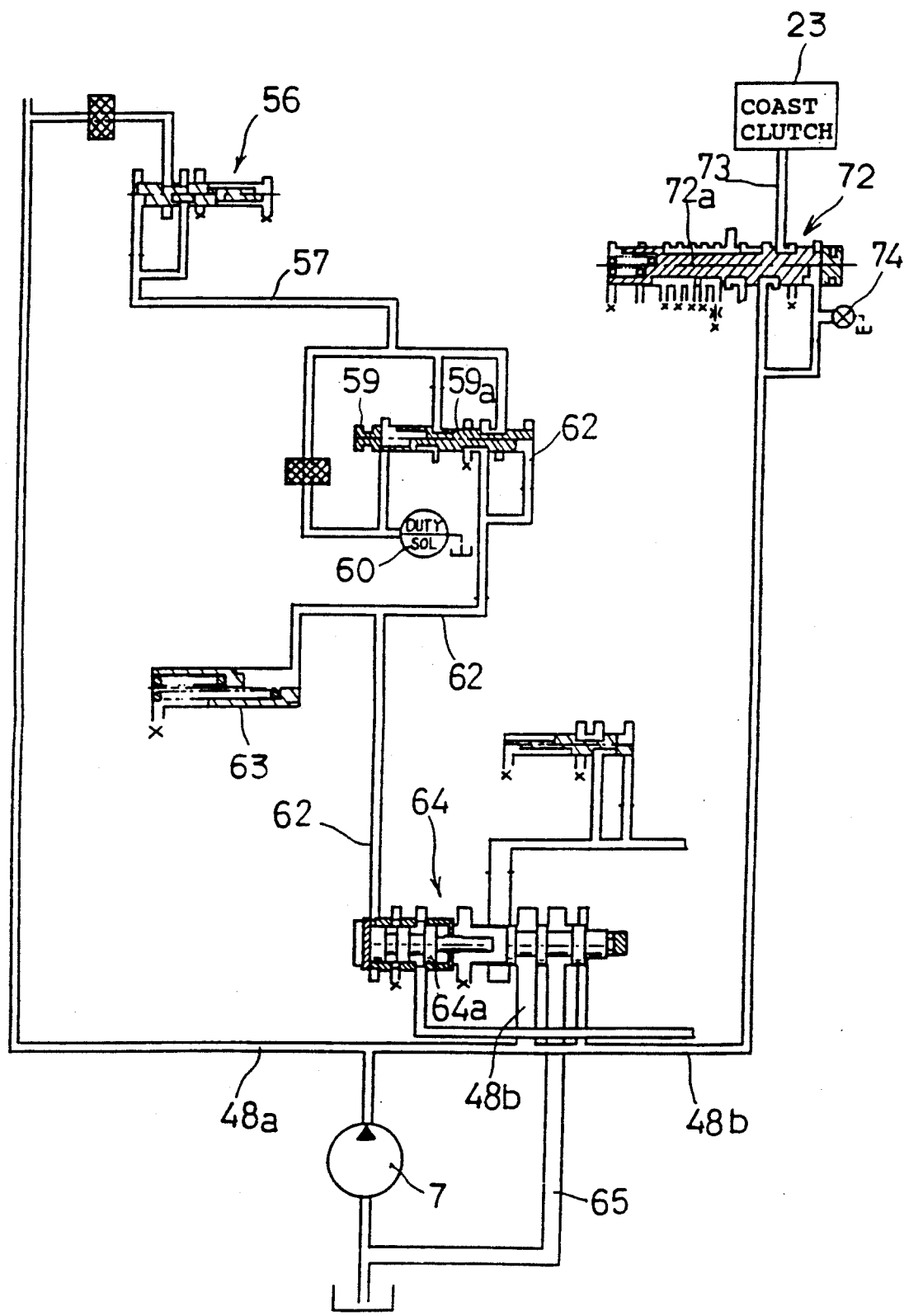
FIG. 4 is a diagram illustrating a hydraulic pressure control circuit of the automatic transmission line pressure control system.

Referring to FIG. 4, a line pressure control circuit of a transmission control hydraulic system FS for shifting the automatic transmission AT to desired gear ratios is shown. The circuit comprises various valves, such as a pressure reducing valve 56, a modulator valve 59, a pressure regulating valve 64, and a 3-4 shift valve 72, which themselves are well known in structure and operation. The pressure reducing valve 56, which is connected to the oil pump 7 through a discharge pressure line 48a, reduces line pressure supplied from the pump to a predetermined pressure and supplies it to a pressure line 57. The modulator valve 59, which is connected to the pressure line 57, receives pilot pressure conducted through a pilot pressure line 62 on its spool 59a at the left hand end as viewed in FIG. 4. The modulator valve 59 is provided with or cooperates with a duty solenoid valve 60, which regulates hydraulic pressure on the spool 59a at the right hand end so as to reduce the hydraulic pressure in the pressure line 57 according to duty rates of the duty solenoid valve 60. The pilot pressure in the pilot pressure line 62 is regulated in this way.

The pressure regulating valve 64 receives hydraulic pressure in the pilot pressure line 62 on its spool 64a at the left hand end as viewed in FIG. 4, and hydraulic pressure in a discharge pressure line 48b from oil pump 7 on its spool 64a at the right hand end. According to differences between the pilot pressure and pump discharge pressure on the spool 64a at the opposite ends, the spool 64a moves in opposite directions so that the discharge pressure line 48b is communicated with and shut off from a pressure drain line 65, thereby regulating the pump discharge pressure, namely, line pressure, in the discharge pressure line 48b to pressures according to pilot pressures in the pilot pressure line 62. The pilot pressure line 62 is provided with an accumulator 63 which absorbs and relieves any pressure pulsations caused in the pilot pressure line 62.

The 3-4 shift valve 72, which is connected with the coast clutch means 23 via pressure line 73, is controlled by a solenoid valve 74. When the solenoid valve 74 is de-energized or fully closed, the 3-4 shift valve 72 permits the spool 72a to move to the left hand end position (as viewed in FIG. 4), so as to supply the line pressure in the discharge pressure line 48b to the coast clutch means 23 through a pressure line 73, thereby locking up the coast clutch means 23.

Figures 5, 6, 8:
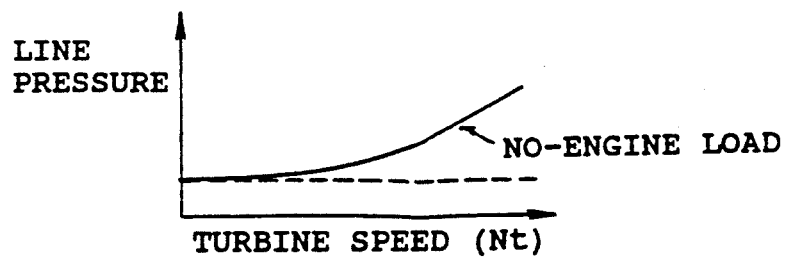
FIG. 5 is a diagram showing a down-shift line pressure map relative to turbine speed and shift pattern used for down-shifting.
FIG. 6 is a diagram showing a line pressure map relative to turbine speed for off-shifting.
FIG. 8 is a line pressure map relative to turbine speed difference.

For creating proper line pressure (PLo) for various down-shift patterns of the automatic transmission AT, the automatic transmission control unit ATC carries a map of line pressure PLo relative to turbine speed and down-shift pattern (which is referred to as a down-shift line pressure map) as shown in FIG. 5. The line pressure (PLo) is established and adjusted so as to relieve shocks caused in the automatic transmission AT during various shift-down operations. For example, the adjustment of line pressure is made, during 4-3 down-shift (i.e., a shift-down from a fourth gear ratio to a third gear ratio), by regulating releasing force necessary to release the 2-4 brake means 26. This is because the 2-4 brake means 26 must be released during a 4-3 down-shift. The adjustment of line pressure is also made, during a 4-2 down-shift (i.e, a shift-down from a fourth gear ratio to a second gear ratio), by regulating the tightening force necessary to tighten or couple the 2-4 brake means 26 when releasing the 3-4 clutch means 24 and, during a 3-2 down-shift (i.e., a shift-down from a third gear ratio to a second gear ratio), by regulating coupling force necessary to couple the 2-4 brake means 26, since the 3-2 down-shift needs to release the 3-4 clutch means 24 and tighten the 2-4 brake means 26. Because both the 3-4 clutch means 24 and 2-4 brake means 26 are released during other down-shifts, such as 4-1, 3-4 and 3-1 down-shifts, the line pressure (PLo) is not always a significant factor for these down-shift patterns.

The automatic transmission control unit ATC further carries a map of line pressure (PL) (which is referred to as a no-down-shift line pressure map) relative to turbine speed and engine load, as shown in FIG. 6, for operations accompanying no down-shift. The line pressure is established and adjusted relative to turbine speed so as to transmit engine braking torque efficiently while the engine is under no load. In FIG. 6, engine load may be replaced with accelerator stroke or opening.

Figure 7:
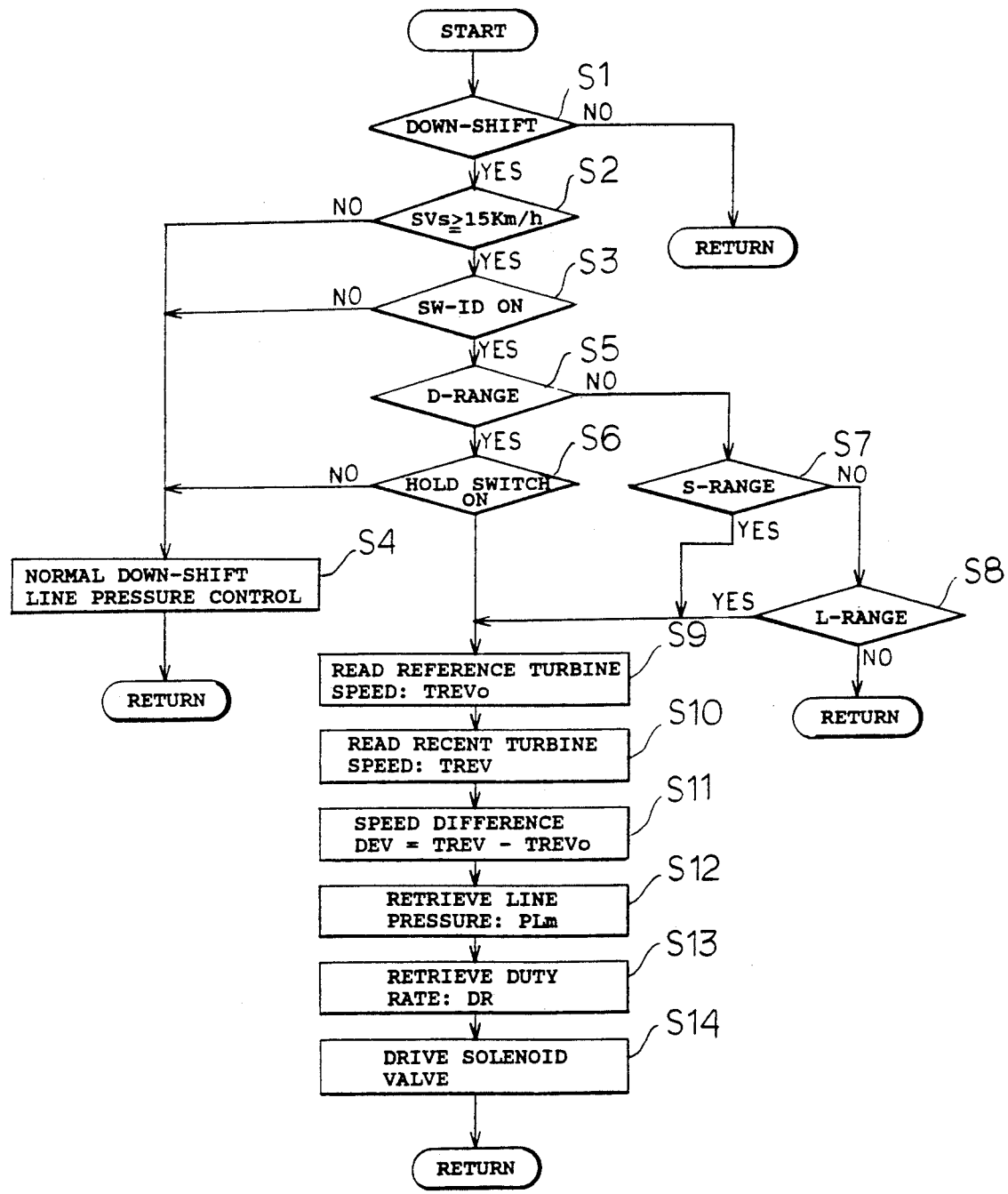
FIG. 7 is a flow chart illustrating a line pressure control sequence for the hydraulic pressure control circuit of FIG. 4 during down-shifting caused by a manual change of the automatic transmission range.

The operation of the automatic transmission AT depicted in FIGS. 1 to 6 is best understood by reviewing FIG. 7, which is a flow chart illustrating a line pressure control routine for manual down-shift operation for the microcomputer of the automatic transmission control unit ATC. Programming a computer is a skill well understood in the art. The following description is written to enable a programmer having ordinary skill in the art to prepare an appropriate program for the microcomputer of the automatic transmission control unit ATC. The particular details of any such program would, of course, depend upon the architecture of the particular computer selected.

Referring to FIG. 7, after making a decision at step S1 as to whether a down-shift is occurring in the automatic transmission AT, a decision is made, based on a signal from the vehicle speed sensor SV at step S2, if in fact a down-shift is occurring, as to whether the vehicle speed SVs is equal to or higher than 15 Km per hour. If the answer to this decision is yes, which indicates that the vehicle is traveling at a speed higher than 15 Km per hour, then a further decision is made at step S3 as to whether the idle switch SW-ID is closed or turned ON. If the vehicle is traveling at a speed lower than 15 Km per hour or if the idle switch SW-ID is OFF although the vehicle is traveling at a speed higher than 15 Km per hour, down-shift line pressure control is conducted to create proper line pressure (PLo), based on an ordinary down-shift line pressure map shown in FIG. 5, at step S4.

On the other hand, if the idle switch SW-ID remains turned ON while the vehicle is traveling at a speed higher than 15 Km per hour, a decision is made based on a signal from the range sensor 5b at step S5 as to whether the shift lever 5 has selected the drive range (D). If the answer to the decision is yes, then a further decision is made based on a signal from the hold switch 5a at step S6 as to whether the hold switch 5a has been pushed or actuated to fixedly hold the automatic transmission AT in the third speed (3rd) gear. If the answer to this decision is yes, this indicates that the hold switch 5a has actually been pushed or actuated, which is accompanied by a 4-3 shift-down for shifting the automatic transmission AT into the third speed (3rd) gear from the fourth speed (4th) gear. Then, line pressure is controlled, in a manual down-shift, through steps S9 to S14, which will be described later. On the other hand, if the answer to the decision is no, this indicates that the hold switch 5a has not been pushed or actuated. Then, the down-shift line pressure control is conducted to create a proper line pressure (PLo) based on the down-shift line pressure map at step S4.

If the answer to the decision regarding the selection of the drive range (D) at step S5 is no, decisions are made at steps S7 and S8 to decide which range the shift lever 5 has selected. The decision made at step S7 is to decide whether or not the shift lever 5 has selected the second range (S). When the shift lever 5 has not selected the second range (S), another decision is made at step S8 whether or not the shift lever 5 has selected the low range (L). If the answer to the decision regarding the selection of the second range (S) at step S7 is yes, this indicates that the shift lever 5 has been changed from a drive range (D) selection position to a second range (S) selction position, which is accompanied by a 4-3 down-shift for shifting the automatic transmission AT into the third speed (3rd) gear from the fourth speed (4th) gear. Then, line pressure is controlled, in a manual down-shift, through steps S9 to S14. Further, if the answer to the decision regarding the selection of the low range (L) at step S8 is yes, this indicates that the shift lever 5 has been changed either from the drive range (D) selection position to a low rang (L) selection position or from the second range (S) selection position to the low range (L) selection position. Such a change is accompanied by a 4-1, 3-1 or 2-1 down-shift for shifting the automatic transmission AT into the first speed (1st) gear from the fourth speed (4th), third speed (3rd) or second speed (2nd) gear. Then, line pressure is controlled, in a manual down-shift, through steps S9 to S14. If the answer to the decision at step S8 is no, the sequence orders return for another line pressure control.

If the answer to the decision at step S6, S7 or S8 is yes, the manual down-shift line pressure control is conducted through steps S9 to S14.

In the manual down-shift line pressure control, a turbine speed TREVo of the turbine 10 of the torque converter TC is read, at the beginning of a down-shift, at step S9 to determine a reference turbine speed. Then, a present turbine speed TREV of the turbine 10 is read at step S10, based on signals from the turbine speed sensor ST. Following this, a turbine speed difference DEV between the most recent turbine speed TREV and the reference turbine speed TREVo is calculated at step S11. Thereafter, a search is made to select a proper manual down-shift line pressure PLm from a manual down-shift line pressure control map, shown in FIG. 8, at step S12. As is apparent in the manual down-shift line pressure control map, the manual down-shift line pressure PLm becomes larger or greater stepwise as the turbine speed difference DEV increases. When the turbine speed difference DEV is equal to or smaller than zero (0), the turbine 10 is slowing down, and the manual down-shift line pressure PLm is secured to a fixed pressure of approximately 4 $Kg/cm^2$ which is, as is shown by a dashed or chained line in FIG. 6, lower than down-shift line pressures (PLo) for turbine speeds close to zero (0) under no engine load.

Finally, after calculating a duty rate DR of the duty solenoid valve 60 necessary to create the manual down-shift line pressure PLm at step S13, the duty solenoid valve 60 is driven at the duty rate DR at step S14, so as to actually create the manual down-shift line pressure PLm.

The automatic transmission control unit ATC is designed and adapted to energize or turn off the solenoid valve 74, cooperating with the coast valve 72 for the coast clutch means 23, after a delay of a predetermined time To when the occurrence of a manual down-shift is detected at any one of steps S6, S7 and S8.

To provide greater understanding of the operation of the line pressure control system of the present invention, a specific example of a manual 3-2 down-shift is now described with reference to FIGS. 9A and 9B.

Figure 9B:
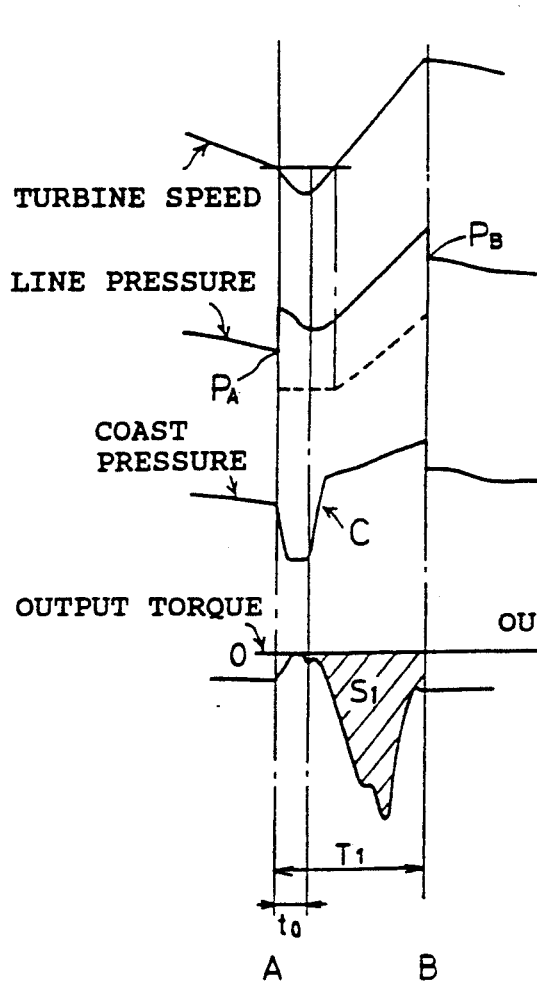
FIGS. 9A and 9B are explanatory time charts of the relationship among various pressures.
Figure 9A:
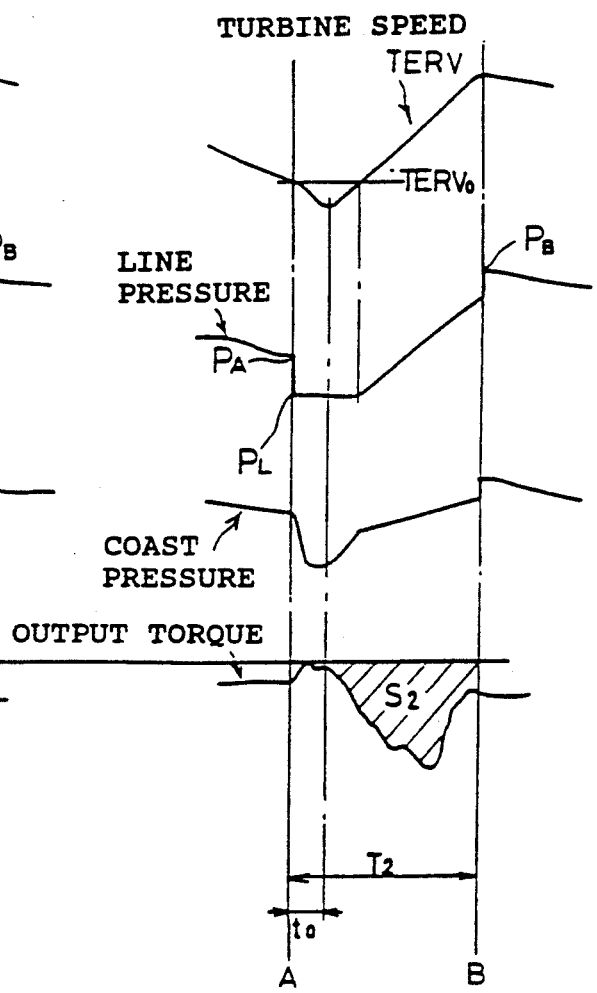
Figure 10:
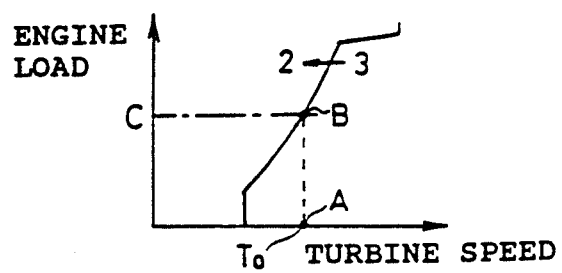
FIG. 10 is a diagram showing a prior art line pressure control based on turbine speed for down-shifting caused by a manual change of automatic transmission range.

As shown in FIG. 9A, a 3-2 down-shift may occur when operating the shift lever 5 at a time A simultaneously with releasing the accelerator pedal, or when pushing or operating the hold switch 5a at a time A simultaneously with releasing the accelerator pedal. The 3-2 down-shift is completed at a time B. The line pressure at the time A, which is a pressure PA determined by engine load and turbine speed at the time A from the manual down-shift pressure map shown in FIG. 6, is forced to drop immediately after the 3-2 down-shift. The pressure drops down to the lowest pressure PLm, for example 4 Kg/cm$^2$, because of a decrease in the turbine speed difference DF below zero (0), due to a release of the accelerator pedal. As the turbine 10 increases its speed TREV and, therefore, the turbine speed difference DF becomes greater than zero (0), the line pressure PLm is gradually increased as specified in the manual down-shift pressure map. When the 3-2 down-shift is completed at the time B, the line pressure PLm approaches a pressure PB obtained from the no-down-shift line pressure map.

It is to be understood that when the turbine speed difference DF is equal to or smaller than zero (0), the line pressure is held at the lowest pressure of 4 Kg/cm$^2$, so as to lower a coupling force for the 2-4 brake means 26, thereby allowing the speed of the engine to increase quickly at the beginning of the 3-2 down-shift. It is also to be understood that when the turbine speed difference DF is larger than zero (0), the line pressure increases as the turbine increases its speed, so as to increase gradually the coupling force for the 2-4 brake means 26 with an increase in engine output torque, thereby causing the 3-2 down-shift to occur.

Because the solenoid valve 74 is de-energized or turned off after the predetermined time To from the time A to supply a line pressure at the lowest pressure PL to the coast clutch means 23 through the 3-4 shift valve 72, the coast clutch means 23 is coupled gradually rather than quickly. This prevents an internal lock of the automatic transmission AT, which is generally caused due to a quick coupling of the coast clutch means 23.

Assuming the line pressure PLm to be established from the down-shift line pressure map shown in FIG. 5 for the 3-2 manual down-shift, as is shown in FIG. 9B, a line pressure may be too high as compared with the line pressure PLm shown in FIG. 9A, between times A and B, for the completion of the 3-2 down-shift. This causes the coupling force for the coast clutch means 23 to rise quickly, as shown by a reference character C, so that the engine output torque changes greatly in a period of time T1 defined between the times A and B. Such a large and quick change in engine output torque causes the automatic transmission AT to produce shift shocks. In contrast, according to the line pressure control of the present invention shown in FIG. 9A, the increasing change in coupling force is sluggish, so that the change in engine output torque is small and is caused in a period of time T2, which is longer than the period of time T1. This smaller change, caused over a longer time, helps to prevent the automatic transmission AT from producing shift shocks. An integrated value of the change (S1, S2) in engine output torque from the beginning of the 3-2 down-shift to the end is the same for both the control shown in FIG. 9A and that shown in FIG. 9B.

Referring to FIGS. 11, 12A to 12D and 13, a line pressure control system FS in accordance with another preferred embodiment of the present invention, for use with the automatic transmission AT depicted in FIG. 1 and 2, is shown.

Figure 11:
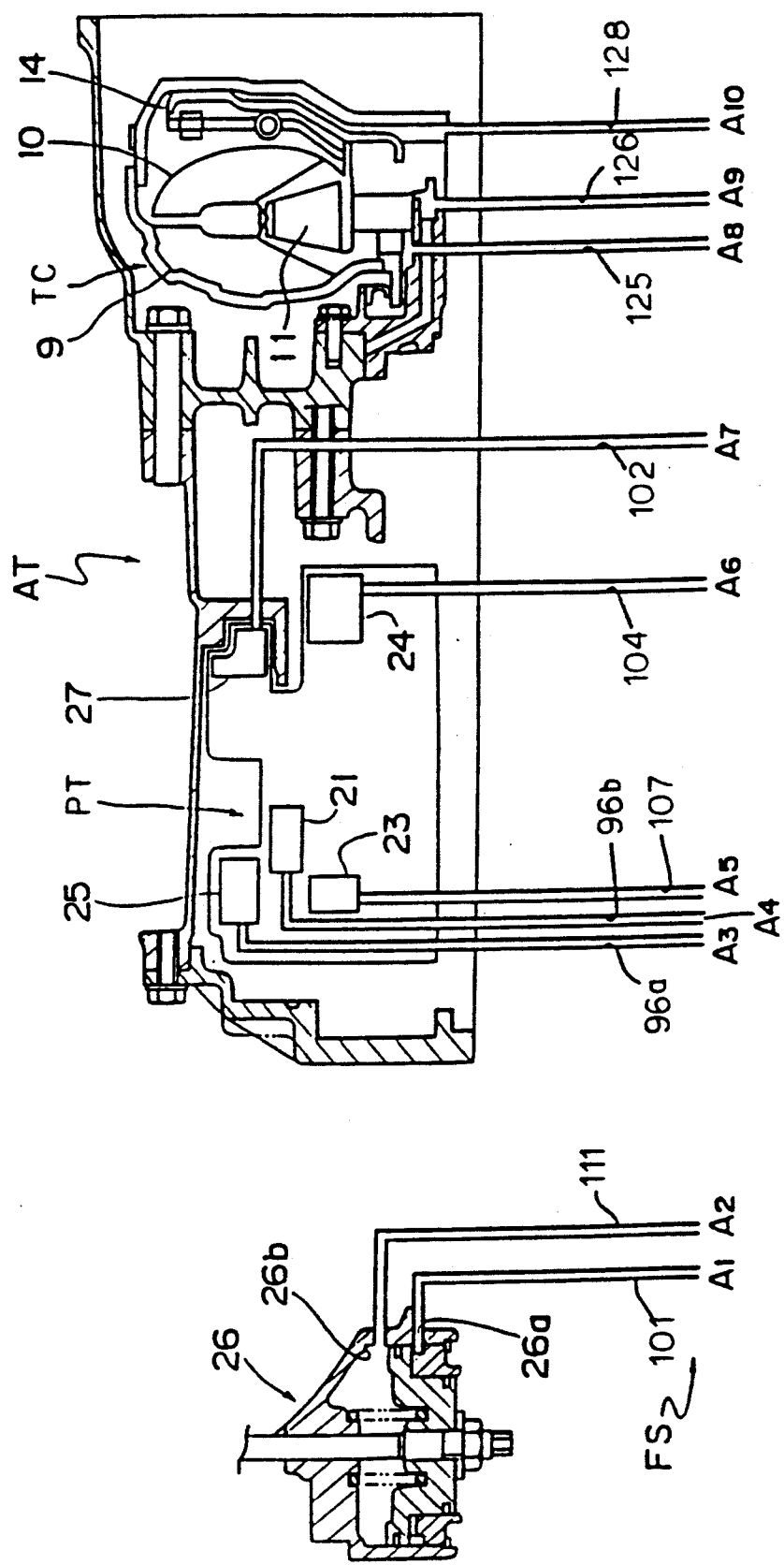
FIG. 11 is a schematic illustration of friction coupling elements of the automatic transmission.

As is shown in FIG. 11, the 2-4 brake means 26 is a servo-piston type of band brake and has a pressure apply port or inlet port 26a and a pressure release port or outlet port 26b. The 2-4 brake means 26 assumes its braking state, to brake the large sun gear 16, when hydraulic pressure develops at the inlet port 26a only and its releasing state, to free the large sun gear 16, when hydraulic pressure develops at both the inlet and outlet ports 26a and 26b and when hydraulic pressure disappears from both the inlet and outlet ports 26a and 26b. All other frictional elements are coupled when hydraulic pressure is applied thereto and released when hydraulic pressure disappears therefrom.

Figures 12, 12A:
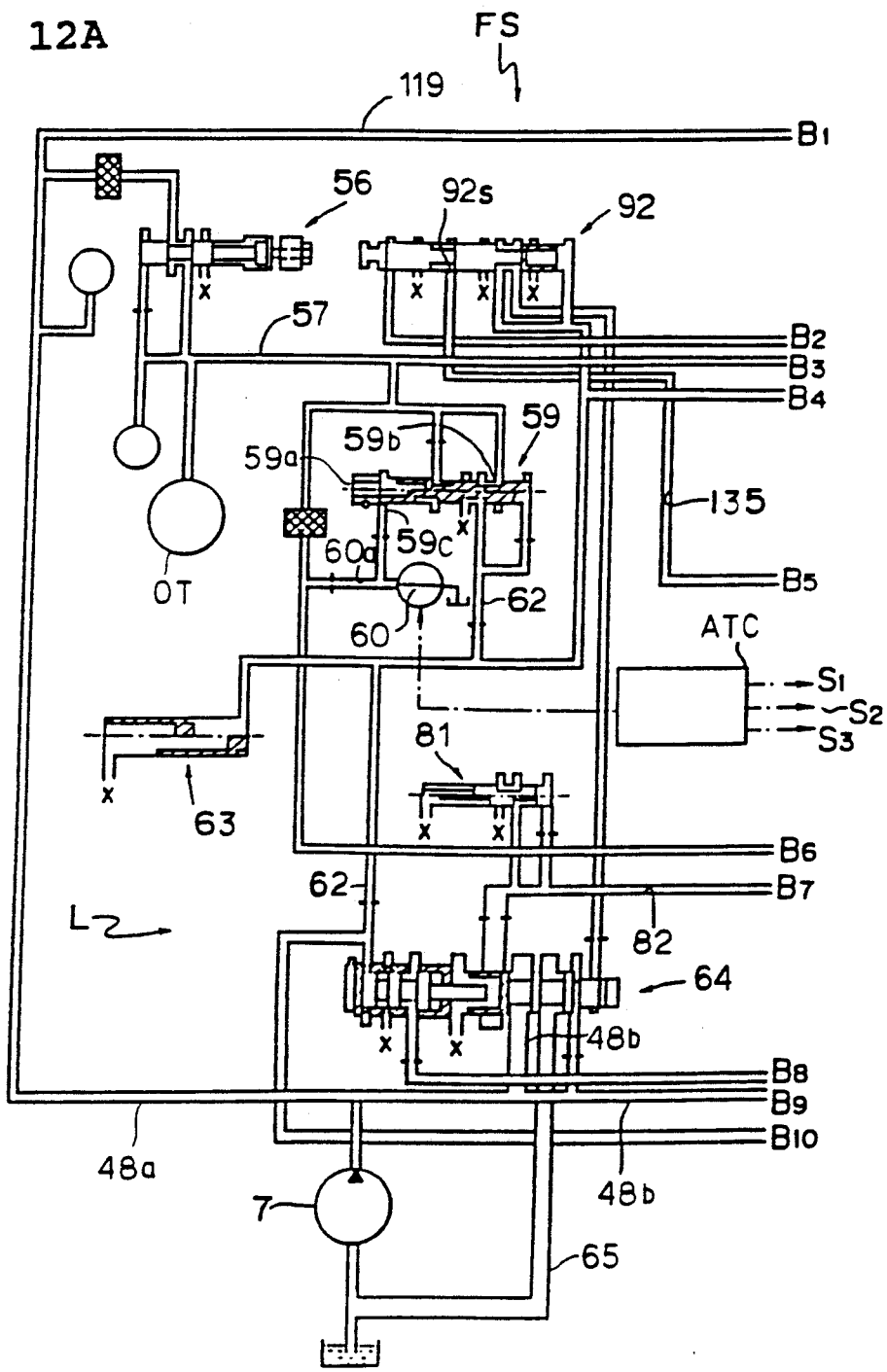
FIG. 12 is a circuit diagram illustrating a hydraulic pressure control system of the automatic transmission line pressure control system in accordance with another preferred embodiment of the present invention.

Referring to FIG. 12A, a line pressure control circuit of a transmission control hydraulic system FS for shifting the automatic transmission At to desired gear speed ratios is shown. The circuit includes various valves, such as a pressure reducing valve 56, a modulator valve 59, a duty solenoid valve 60, an accumulator 63 and a pressure regulating valve 64, all of which operate similarly to those shown in FIG. 4.

The line pressure in the pressure line 48a is, after being reduced by the pressure reducing valve 56, supplied to an inlet port 59b of the modulator valve 59 through a pressure line 57. Hydraulic pressure in the pressure line 57 is also supplied to a control port 59c of the modulator valve 59 through the a duty pressure line 60a. The hydraulic pressure supplied to the control port 59c of the modulator valve 59 is controlled by the duty solenoid valve 60, which operates at a duty ratio in accordance with a duty signal provided from an automatic transmission control unit ATC so as to control or regulate the line pressure. The duty ratio, which will be described in detail later, is created according to various factors, such as throttle openings, vehicle speeds, automatic transmission ranges and gear speed ranges.

Hydraulic pressure, equivalent to the hydraulic pressure supplied to the control port 59c of the modulator valve 59, develops as pilot pressure in a pilot pressure line 62. The accumulator 63 provided in the pilot pressure line 62 absorbs or relieves pressure pulsations which may possibly be caused in the pilot pressure line 62. The pilot pressure, thus developed, is supplied to the pressure regulating valve 64 to create line pressure proportional thereto in a controlled line pressure line 48b. The pilot pressure in the pilot pressure line 62 is also supplied to a cut-back valve 92 which will be described later.

Figure 12B:
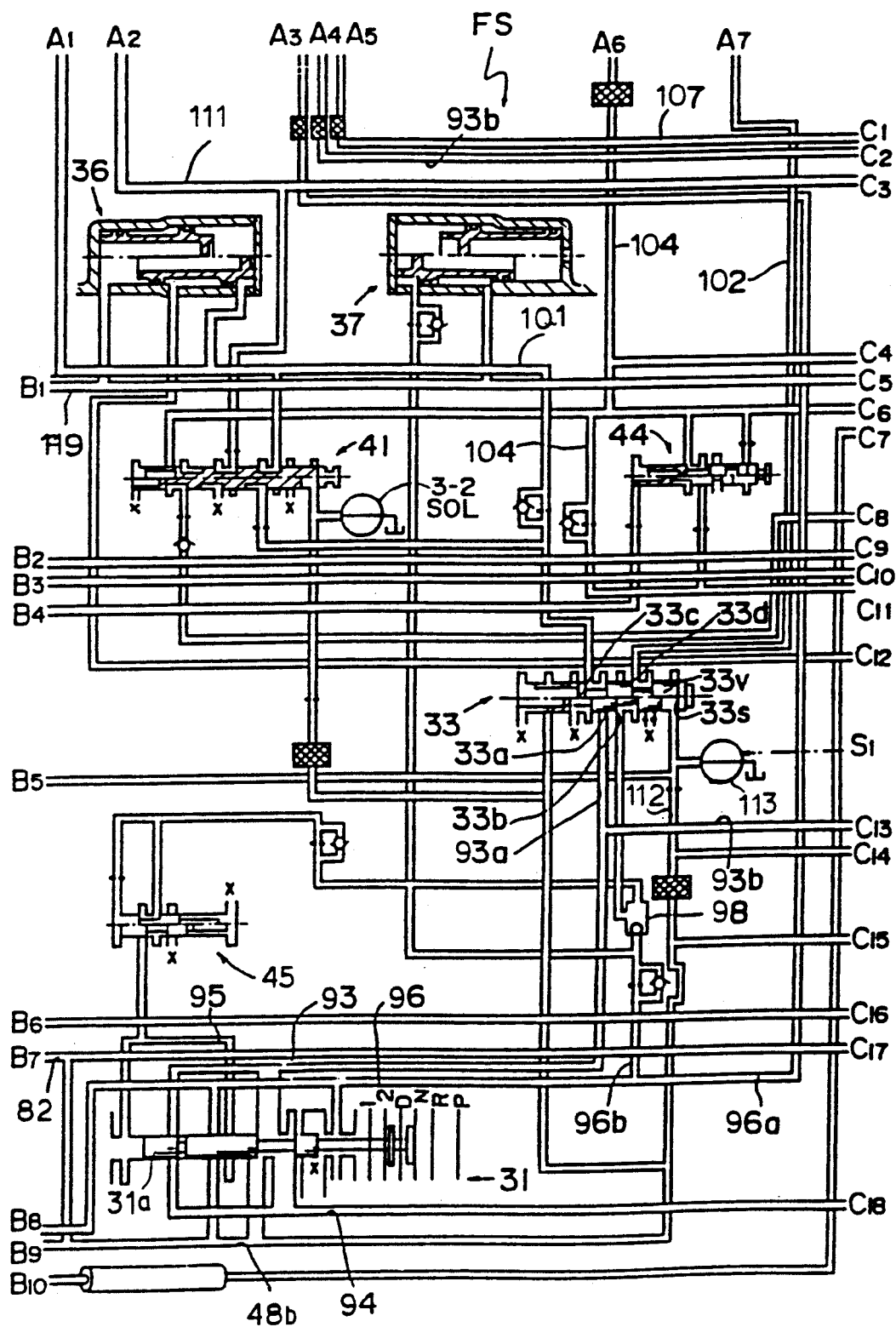
Figure 12C:
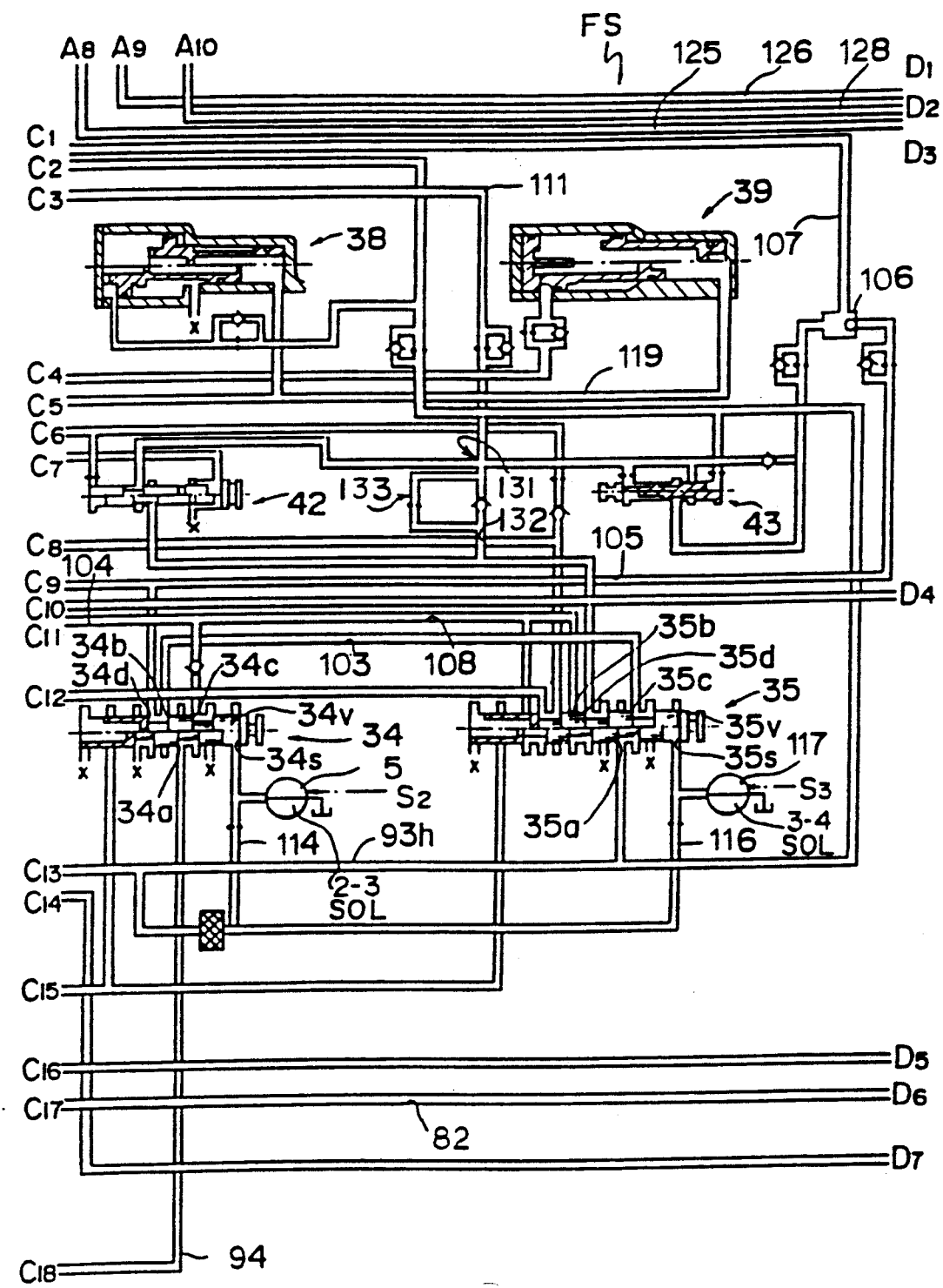

Referring to FIGS. 12B and 12C, a manually controlled shift valve 31 cooperates with the shift lever 5 to shift its spool 31a according to selected ranges so that the controlled line pressure line 48b is selectively communicated with and shut off from various pressure lines for the frictional coupling elements of the automatic transmission AT. In detail, the controlled line pressure line 48b is communicated with first and second main pressure lines 93 and 94 in the drive range (D) and the second range (S), with the first and third main pressure lines 93 and 95 in the first range (L), with a reverse-pressure line 96 in the reverse range (R), and is shut off from all of the pressure lines 93 to 96 in the neutral range (N).

The first main pressure line 93 branches off into a pressure line 93a from a 1-2 shift valve 33 and a pressure line 93b for the forward clutch means 21. The pressure line 93a is connected to a first inlet port 33a of the 1-2 shift valve 33. The pressure line 93b branches off into pressure lines so as to be independently connected to a first inlet port 35a of a 3-4 shift valve 35 and the forward clutch means 21, respectively. The second main pressure line 94 is connected to a first inlet port 34a of a 2-3 shift valve 34. The third main pressure line 95 is connected to a second branch pressure line 96b, branching off from the reverse pressure line 96, and to a second inlet port 33b of a 1-2 shift valve 33, via a low reducing valve 45 and a ball valve 98. The reverse pressure line 96 branches off into two branch pressure lines, namely, a first branch pressure line 96a connected to the reverse clutch means 25 and the second branch pressure line 96b. The second branch pressure line 96b is connected to the second inlet port 33b of the 1-2 shift valve 33, via the ball valve 98 only.

The shift valves 33 to 35 are controlled by the automatic transmission control unit ATC so as to supply hydraulic pressure, present at their inlet ports, to various ones of their outlet ports, according to a selected range and speed gear ratio of the automatic transmission AT, thereby applying and draining hydraulic pressure to and from the frictional coupling elements necessary for placing the automatic transmission AT in the selected range and speed gear ratio.

In more detail, the 1-2 shift valve 33 has, in addition to the first and second inlet ports 33a and 33b, a first outlet port 33c connected to an inlet port 36a of the 2-4 brake means 26 through a pressure line 101, and a second outlet port 33d connected to the low reverse brake means 27 through a pressure line 102. The 2-3 shift valve 34 has, in addition to the first inlet port 34a, a second inlet port 34b, connected to a first outlet port 35c of the 3-4 shift valve 35 through a first pressure line 103, a first outlet port 34c, connected to the 3-4 clutch means 24 through a pressure line 104, and a second outlet port 34d, connected to the coast clutch means 23 through a second pressure line 105, a ball valve 106 and a coast pressure line 107. The pressure line 104 branches off into a third connection pressure line 108 which, in turn, is connected to a second inlet port 35b of the 3-4 shift valve 35. The 3-4 shift valve 35 has, in addition to the first and second inlet ports 35a and 35b and the first outlet port 35c, a second outlet port 35d connected to a pressure release port or outlet port 26b of the 2-4 brake means 26 through a pressure line 111 and to the coast clutch means 23 through the coast pressure line 107. The pressure lines 107 and 111 are united together at a juncture point 131 which is located near the second output port 35d of the 3-4 shift valve 35.

The shift valves 33 to 35 change positions of their spools 33v, 34v and 35v, respectively, so as to selectively open and close their inlet and outlet ports. It is to be noted that open and closed states or positions of each shift valve are referred to as on-states and off-states, respectively. As viewed in FIGS. 12B and 12C, the shift valve holds the spool at the right hand end position (which is shown by the upper half portion of the spool) in the on-state and at the left hand end position (which is shown by the lower half portion of the spool) in the off-state. Each shift valve 33, 34 or 35 is maintained closed while a pilot pressure is released from a control pressure chamber 33s, 34s or 35s of the shift valve, respectively, and open while a pilot pressure is applied into the control pressure chamber of the shift valve.

The 1-2 shift valve 33 is connected at the control pressure chamber 33s with a first control-pressure line 112 branching off from the pressure line 48b. The first control-pressure line 112 is provided with a first solenoid valve 113. The first solenoid valve 113 is energized or turned on to release the pilot pressure from the control pressure chamber 33s through the first control-pressure line 112 so as to bring the 1-2 shift valve 33 into its on-position and is de-energized or turned off to apply the pilot pressure into the control pressure chamber 33s so as to bring the 1-2 shift valve 33 into its off-position. The 1-2 shift valve 33 communicates, in the on-position, the first outlet port 33c with the first inlet port 33a, and the second outlet port 33d with one of drain ports (which is marked by an x symbol) and, on the other hand, in the off-position, the first outlet port 33c with a drain port x, and the second outlet 33d with the second inlet port 33b.

The 2-3 shift valve 34 is connected at the control pressure chamber 34s with a second control-pressure line 114 branching off from the pressure line 93b connected to the forward clutch means 21. The second control-pressure line 114 is provided with a second solenoid valve 113. The second solenoid valve 113 is energized or turned on by the automatic transmission control unit ATC to release the pilot pressure from the control pressure chamber 34s so as to bring the 2-3 shift valve 34 into its on-position, and is de-energized or turned off to apply the pilot pressure into the control pressure chamber 34s so as to bring the 2-3 shift valve 34 into its off-position. The 2-3 shift valve 34 communicates, in the on-position, the second outlet port 34d with the second inlet port 33b and the first outlet port 34c with a drain port x. In the off-position, 2-3 shift valve 34 communicates the first outlet port 34c with the first inlet port 34a and the second outlet 34d with a drain port x.

The 3-4 shift valve 35 is connected, at the control pressure chamber 35s, with a third control-pressure line 116 branching off from the second control-pressure line 114. The third control-pressure line 116 is provided with a third solenoid valve 117. The third solenoid valve 117 is energized or turned on by the automatic transmission control unit ATC to release the pilot pressure from the control pressure chamber 35s so as to bring the 3-4 shift valve 35 into its on-position and is de-energized or turned off to apply the pilot pressure into the control pressure chamber 35s so as to bring the 3-4 shift valve 35 into its off-position. The 3-4 shift valve 35 communicates, in the on-position, the first and second outlet ports 35c and 35d with drain ports x and, on the other hand, in the off-position, the first outlet port 35c with the first inlet port 35a and the second outlet 35d with the second inlet port 35b.

In order for the automatic transmission AT to avoid shift shocks when the frictional coupling elements are released rapidly, there are provided accumulators, such as a 1-2 accumulator 36 in association with the pressure line 101 for the apply port 26a of the 2-4 brake means 26, an N-R accumulator 37 in association with the second branch pressure line 96b for the 1-2 shift valve 33, an N-D accumulator 38 in association with the pressure line 93b for the forward clutch means 21, and a 2-3 accumulator 39 in association with the pressure line 104 for the 3-4 clutch means 24.

In order to permit the multi-gear speed shift mechanism MT to avoid occurrences of internal locking during shifting of the automatic transmission AT, various valves 41 to 44 (which are described later) are provided for causing the frictional coupling elements to operate timely.

Figure 12D:
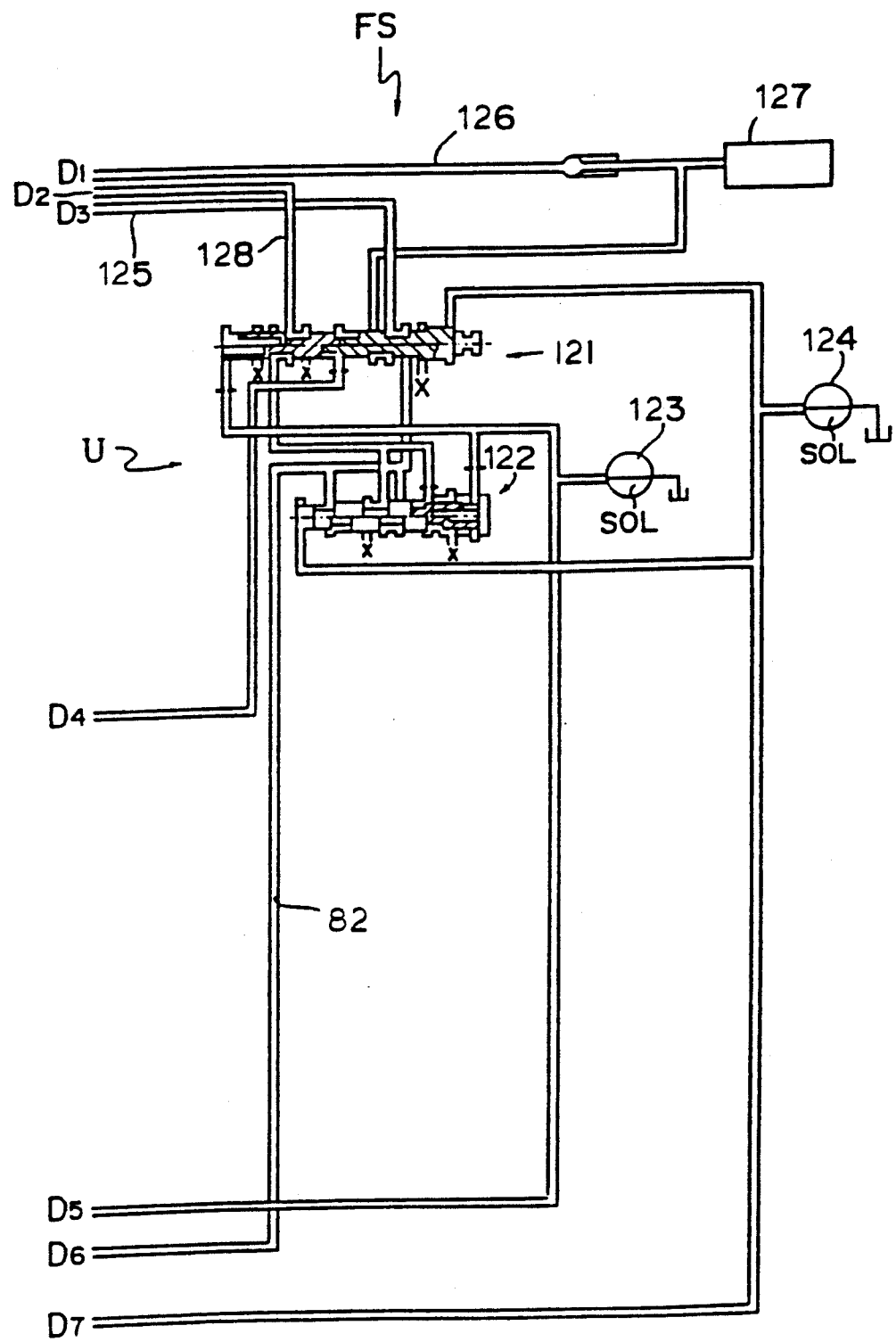

Referring to FIG. 12D, for locking up and unlocking the torque converter TC, the line pressure control system FS is provided with a lock-up control system U, comprising various lock-up valves, such as a lock-up shift valve 121 and a lock-up control valve 122, and first and second lock-up control solenoid valves 123 and 124, which are well known in structure and operation in the art. The lock-up control system U operates to apply working oil to the torque convertor TC through a lock-up pressure line 125 and introduce the working oil to an oil cooler 127 through a return line 126. The lock-up control system U further applies hydraulic pressure to the lock-up clutch means 14 through a lock-up pressure line 128.

Figures 13, 14:
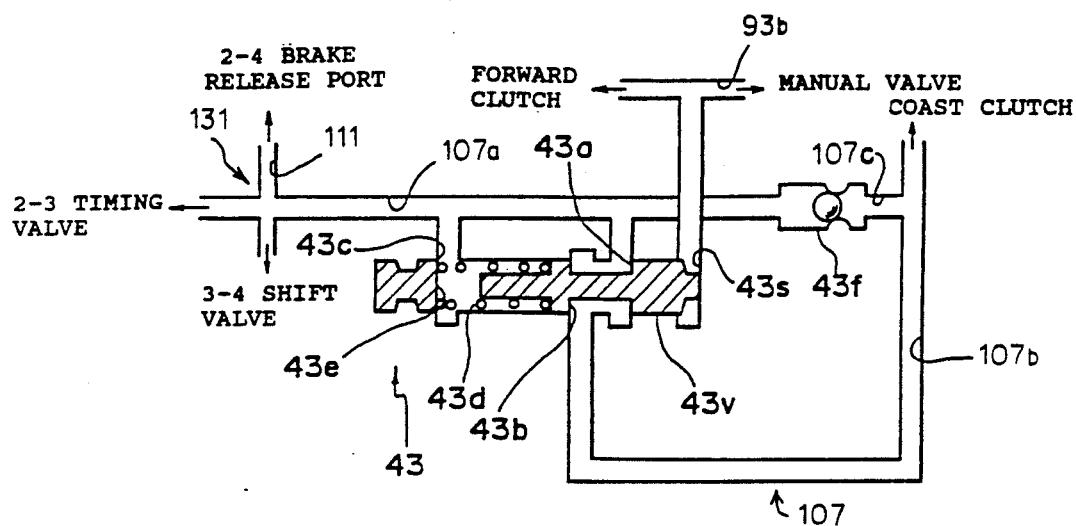
FIG. 13 is an illustration showing details of pressure lines in communication with a coast timing valve.
FIG. 14 is a table showing the operations of first to third solenoid valves of the hydraulic pressure control circuit of FIG. 12.

The line pressure control system FS controls the operation of the first to third solenoid valves 113, 115 and 117 so that they are selectively energized or turned on and de-energized or turned off according to selected positions of the manually controlled shift valve 31. The solenoid valves thus place the automatic transmission AT into any desired speed gear ratio in each selected range. The first to third solenoid valves 113, 115 and 117 are selectively energized and de-energized as shown in FIG. 13. In the table shown in FIG. 3, the solenoid valves are energized in ranges and at gear ratios indicated by circles and de-energized in ranges and gear ratios marked by the character "x".

It is to be understood from the table that since no hydraulic pressure is applied into any of the first, second or third main pressure lines 93 to 95 or the reverse pressure line 96 in the park range (P) and neutral range (N), all of the frictional elements are released, regardless of the states of energization of the first to third solenoid valves 113, 115 and 117. The multi-gear speed shift mechanism MT is, therefore, in neutral and does not transmit any torque.

Describing the path of hydraulic pressure at various speed gear ratios in each range with reference to the table of FIG. 13, when the manually operated shift valve 31 selects the reverse range (R), the first and second solenoid valves 113 and 115 are de-energized or turned off; the third solenoid valve 117 is energized or turned on. As a result, hydraulic pressure is applied to the reverse pressure line 96 and then to the reverse clutch means 25 through the first branch pressure line 96a so as to couple the reverse clutch means 25. The hydraulic pressure in the reverse-pressure line 96 is also applied to the low-reverse brake means 27, through the second inlet port 33b and second outlet port 33c of the 1-2 shift valve 33, and then the low-reverse pressure line 102 so as to couple the low-reverse brake means 27. All the frictional coupling elements other than the reverse clutch means 25 and the low-reverse brake means 27 have no hydraulic pressure applied thereto, and are released.

When the manually operated shift valve 31 selects the drive range (D) as is shown in FIG. 12C, hydraulic pressure is applied into the first and second main pressure lines 93 and 94.

Shifting the automatic transmission AT to the first speed gear (1st) renders the first solenoid valve 113 de-energized or turned off, and the second and third solenoid valves 115 and 117 energized or turned on. As a result, hydraulic pressure in the first main pressure line 93 is applied to the forward clutch means 21 through the forward pressure line 93b, so as to couple the forward clutch means 21. Since no hydraulic pressure is provided from any shift valve 33, 34 or 35, all the frictional coupling elements other than the forward clutch means 21 have no hydraulic pressure applied thereto, and are released.

Shifting the automatic transmission AT to the second speed gear (2nd) causes each of the first to third solenoid valves 113 to 115 to be energized or turned on. As a result, the forward clutch means 21 is coupled, and hydraulic pressure in the first main pressure line 93 is applied to the apply port 26a of the 2-4 brake means 26 through the pressure line 93a, the first inlet port 33a and first outlet port 33c of the 1-2 shift valve 33, and the pressure line 101. No hydraulic pressure is applied to the release port 26b of the 2-4 brake means 26 so as to couple the 2-4 brake means 26. All the frictional coupling elements, other than the 2-4 brake means 26, have no hydraulic pressure applied to them and are released.

Shifting the automatic transmission AT to the third speed gear (3rd) causes each of the first solenoid valve 113 energized or turned on and the second and third solenoid valves 115 and 117 de-energized or turned off. As a result, the forward clutch means 21 is coupled, and hydraulic pressure in the first main pressure line 93 is applied to the apply port 26a of the 2-4 brake means 26. However, as will be described later, since hydraulic pressure is applied to the release port 26b of the 2-4 brake means 26, the 2-4 brake means 26 is released. Hydraulic pressure in the second main pressure line 94 is applied to the 3-4 clutch means 24 through the first inlet port 34a and first outlet port 34c of the 2-3 shift valve 34, and the pressure line 104, so as to couple the 3-4 clutch means 24. The hydraulic pressure in the pressure line 104 is further applied to the coast clutch means 23 through the third connection pressure line 108, the second inlet port 35b and second outlet port 35d of the 3-4 shift valve 35, and the coast pressure line 107, so as to couple the coast clutch means 23. The hydraulic pressure at the second outlet port 35d of the 3-4 shift valve 35 is applied to the release port 26b of the 2-4 brake means 26 through the release pressure line 111, so as to release the 2-4 brake means 26. The reverse clutch means 25 and the low-reverse brake means 27 are not subjected to any hydraulic pressure and are released.

Shifting the automatic transmission AT to the fourth speed gear (4th) causes the first and third solenoid valves 113 and 117 to be energized or turned on and the second solenoid valve 115 to be de-energized or turned off. As a result, the forward clutch means 21, the 3-4 clutch means 24 and the 2-4 brake means 26 are coupled; all other frictional coupling elements are subjected to no hydraulic pressure and are released.

In the second range (S) selected by the shift valve 31, shifting the automatic transmission AT to the first speed gear (1st) the same path for hydraulic pressure is formed as at the first speed gear (1st) in the drive range (D).

Shifting the automatic transmission AT to the second speed gear (2nd) causes the first and second solenoid valves 113 and 115 to be energized or turned on and the third solenoid valve 117 to be de-energized or turned off. As a result, the forward clutch means 21 and the 2-4 brake means 26 are coupled in the same manner as at the second speed gear (2nd) in the drive range (D). Hydraulic pressure in the forward pressure line 93b is applied to the coast clutch means 23 through the first inlet port 35a and first outlet port 35c of the 3-4 shift valve 35, the first connection pressure line 103, the second inlet port 34b and second outlet port 34d of the 2-3 shift valve 34, the second connection pressure line 105, the ball valve 106, and the coast pressure line 10t, in this order, so as to couple the coast clutch 23. All other frictional coupling elements have no hydraulic pressure applied to them and are released.

Shifting the automatic transmission AT to the third speed gear (3rd) forms the same path of hydraulic pressure as at the third speed gear (3rd) in the drive range (D).

In the first range (L) selected by the shift valve 31, hydraulic pressure is applied to the first and third main pressure lines 93 and 95. Shifting the automatic transmission AT to the first speed gear (1st) renders the first and third solenoid valves 113 and 117 de-energized or turned off and the second solenoid valve 115 energized or turned on. As a result, the forward clutch means 21 and the coast clutch means 23 are coupled. Hydraulic pressure in the third main pressure line 95 is applied to the low-reverse brake means 27 through the low reducing valve 45, the ball valve 98, the second branch pressure line 96b, the second inlet port 33b and second outlet port 33d of the 1-2 shift valve 33, and the low-reverse pressure line 102, so as to couple the low-reverse brake means 27. All other frictional coupling elements have no hydraulic pressure applied to them and are released.

Shifting the automatic transmission AT to the second speed gear (2nd) forms the same path for hydraulic pressure as at the second speed gear (2nd) in the second range (S).

As was previously mentioned, the line pressure control system SF is provided with timing valves 41 to 44 for causing the frictional coupling elements to operate timely for the purpose of avoiding internal locking of the multi-gear speed shift mechanism MT during shifting of the automatic transmission AT.

A coast timing valve 43 is provided in the coast pressure line 107, connected to the second outlet port 35d of the 3-4 shift valve 35. As was previously described, the coast pressure line 107 and the release pressure line 111 are united together near the second outlet port 35d of the 3-4 shift valve 35 and separately extend after the juncture point 131 (see FIG. 13). A 2-3 timing valve 42 is disposed in the coast pressure line 107 or the release pressure line 111 between the 3-4 shift valve 35 and the juncture point 131. The 2-3 timing valve 42 applies hydraulic pressure to the release pressure line 111 and the coast pressure line 107 responding to a rise of hydraulic pressure in the pressure line 104 for the 3-4 clutch means 24 when the automatic transmission AT shifts up to the third speed gear (3rd) from the second speed gear (2nd). The coast pressure line 107 or the release pressure line 111 to the 2-4 brake means 26 is further provided with a bypass line 132, having a one=-Way orifice 133, in parallel with a part of the pressure lines 107 and 111 in which the 2-3 timing valve is disposed, between the 3-4 shift valve 35 and the juncture point 131. A bypass valve 44 adjusts a time at which the 3-4 clutch means 24 is coupled when the automatic transmission AT shifts up to the third speed gear (3rd) from the second speed gear (2nd). A 3-2 timing valve 41 adjusts times at which the 2-4 brake means 26 is coupled and released when the automatic transmission AT shifts down to the second speed gear (2nd) from the third speed gear (3rd).

Referring to FIG. 13, showing the coast timing valve 43 in more detail, the coast timing valve 43 has an inlet port 43a and a timing control port 43c, both of which are connected to a part of the coast pressure line 107 upstream of the coast timing valve 43 (which is referred to as an upstream coast pressure line 107a). The coast timing valve 43 is formed with a control pressure chamber 43e in communication with the timing control port 43c at the left hand end of the valve as viewed in FIG. 12. The coast timing valve 43 further has an outlet port 43b, which is connected to a part of the coast pressure line 107 downstream of the coast timing valve 43 (which is referred to as a downstream coast pressure line 107b). The upstream and downstream coast pressure lines 107a and 107b are directly connected by a connection line 107c with a ball valve 43f disposed therein.

A spool 43v of the coast timing valve 43 is urged by a spring 43d towards the right hand end as viewed in FIG. 13. The coast timing valve 43 is further formed with a control pressure chamber 43s, at the right hand end thereof, to which hydraulic pressure in the forward pressure line 93b (which is almost equal to line pressure) is supplied.

In operation of the coast timing valve 43 shown in FIG. 12, as was previously described, no hydraulic pressure is applied into the upstream coast pressure line 107a and the release pressure line 111 in communication with the 2-4 brake means 26 through the 3-4 shift valve 35 when the automatic transmission AT is at the second speed gear (2nd) and at the third speed gear (3rd). The spool 43v of the coast timing valve 43 is forced to the left under the hydraulic pressure in the control pressure chamber 43s so as to close the inlet and outlet ports 43a and 43c. While the coast timing valve 43 closes the inlet and outlet ports 43a and 43c, the 2-4 brake means 26 has, at its apply port 26a, hydraulic pressure applied thereto for braking.

Shifting the automatic transmission AT into the third speed gear (3rd) allows hydraulic pressure to be applied basically into the upstream coast pressure line 107a and the release pressure line 111 in communication with the 2-4 brake means 26 through the second outlet port 35d of the 3-4 shift valve 35. As was previously described, shifting up the automatic transmission AT into the third speed gear (3rd) from the second speed gear (2nd) allows hydraulic pressure, corresponding to the hydraulic pressure in the pressure line 104 in communication with the 3-4 clutch means 24, to be applied into the upstream coast pressure line 107a and the release pressure line 111 in communication with the 2-4 brake means 26 responding to the operation of the 2-3 timing valve 42. The hydraulic pressures in the upstream coast pressure line 107a and the release pressure line 111 in communication with each other are substantially equal to each other. At this time, although the release port 26b of the 2-4 brake means 26 has hydraulic pressure applied thereto immediately after shifting up the automatic transmission AT into the third speed gear (3rd) from the second speed gear (2nd), because the coast timing valve 43 disconnects the inlet and outlet ports 43a and 43b from each other, the downstream coast pressure line 107b, in communication with the coast clutch means 23, does not have hydraulic pressure immediately applied thereto. Thereafter, when the hydraulic pressure in the release port 26b of the 2-4 brake means 26 rises higher than a predetermined pressure, the 2-4 brake means 26 is released. However, during the rise of hydraulic pressure in the release port 26a of the 2-4 brake means 26, the coast timing valve 43 does not operate, so as to keep the inlet and outlet ports 43a and 43b disconnected. Further, when the hydraulic pressure in the control pressure chamber 43e of the coast timing valve 43 rises, responding to a rise of the hydraulic pressure in the upstream coast pressure line 107a, the coast timing valve 43 forces the spool 43v to move to the right so as to communicate the inlet and outlet ports 43a and 43b with each other. As a result, the downstream coast pressure line 107b, in communication with the coast clutch means 23, has hydraulic pressure applied thereto, so that the coast clutch means 23, has coupled. In this way, the coast clutch means 23 is coupled after the 2-4 brake means 24 has been completely released, so that no internal shock is generated in the multi-gear speed shift mechanism MT.

When manually shifting the automatic transmission AT into the second rang (S) by the use of the shift lever 5 while the vehicle is traveling in the drive range (D), or holding the automatic transmission AT in the drive range (D) while the vehicle is traveling in the drive range (D), the automatic transmission AT is forced to shift into the third speed gear (3rd). In such a case, because the accelerator pedal is not depressed to thereby close fully the throttle valve, the conventional automatic transmission needs a long time to shift, due to a drop in line pressure, which worsens the responsiveness of the automatic transmission AT.

The automatic transmission line pressure control system of the preferred embodiment of the present invention controls line pressure so as not to produce coupling shocks during a down-shift. The responsiveness in shifting of the automatic transmission AT is thereby improved. The operation of the automatic transmission line pressure control system depicted in FIGS. 1, 2, 11, 12A to 12D and 13 is best understood by reviewing FIG. 15, which is a flow chart illustrating a line pressure control sequence for the microcomputer of the automatic transmission control unit ATC. Again, programming a computer is a skill well understood in the art. The following description has been written to enable a programmer having ordinary skill in the art to prepare an appropriate program for the microcomputer of the automatic transmission control unit ATC. The particular details of any such program would, of course, depend upon the architecture of the particular computer selected.

Figure 15:
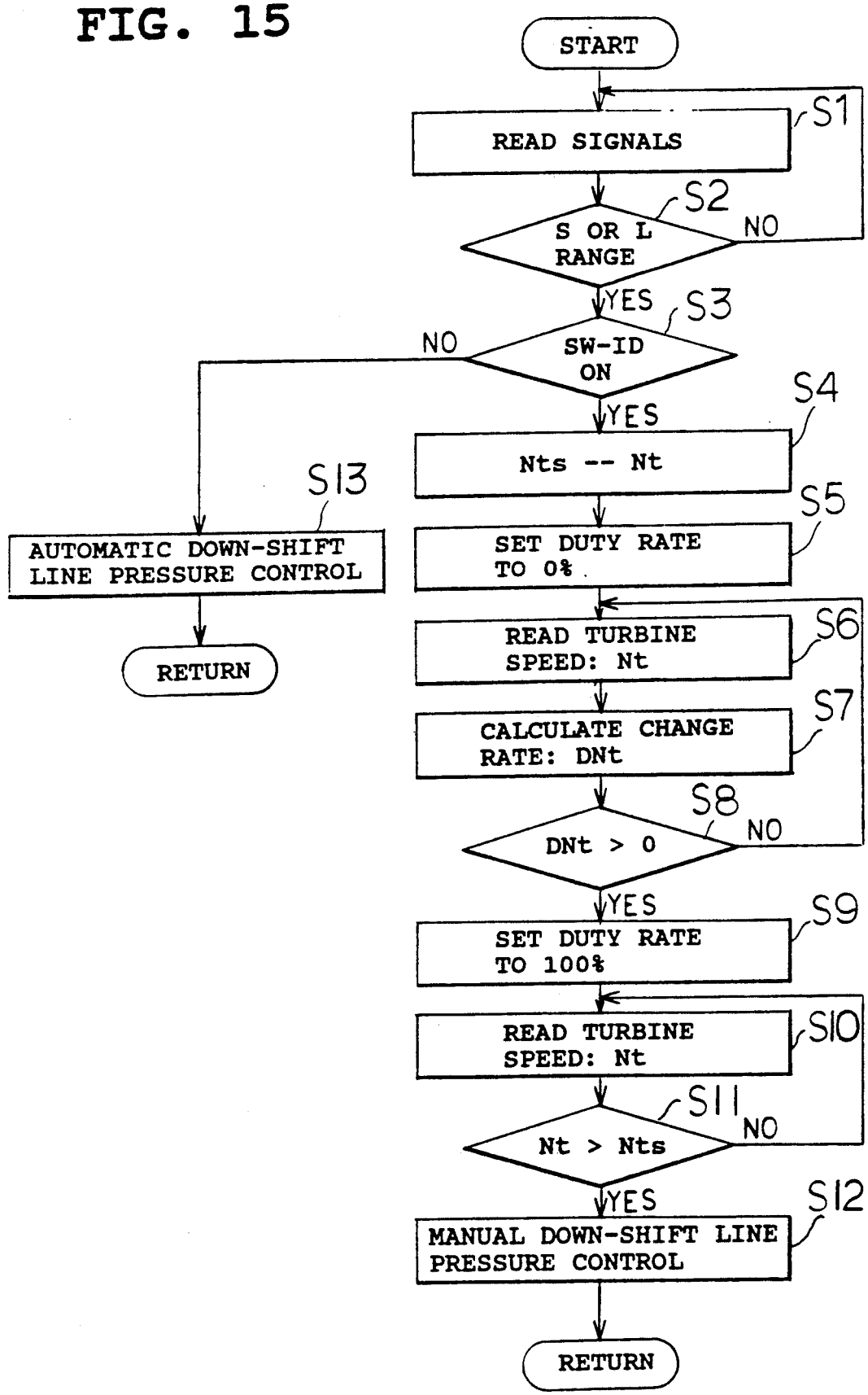
FIG. 15 is a flow chart illustrating a line pressure control sequence for the hydraulic pressure control circuit of FIG. 12 during down-shifting caused by a manual change of the automatic transmission range.

Referring to FIG. 15, illustrating the automatic transmission line pressure control sequence, immediately after commencing the control, the first step at step S1 is to read signals, representative of various control factors, such as a selected range, the speed of turbine Nt, an idle condition, etc., from the range sensor 5b, the turbine speed sensor ST, and the idle switch SW-ID. Thereafter, a decision is made at step S2 as to whether the shift lever 5 has been operated to shift the automatic transmission AT into any range (S range or L range) other than the drive range (D), neutral range (N) and reverse range (R). If the answer to this decision is no, indicating no manual shift-down is demanded, then the sequence repeats the first two steps at steps S1 and S2 until a yes answer is provided.

If the answer to the decision at step S2 is yes, this indicates that the shift lever 5 has been operated to shift the automatic transmission AT into either the second range (S) or the first range (L), and another decision is made at step S3 as to whether the idle switch SW-ID has been turned on. If the answer to this decision is no, this indicates that the accelerator pedal is depressed and, therefore, that no manual shift-down is demanded. Then, a normal line pressure control for automatic shift-down (which is well known in the art) is performed at step S13. After the performance of the normal automatic transmission line pressure control, the automatic transmission line pressure control sequence is restarted. On the other hand, if the answer to the decision regarding the idle switch SW-ID is yes, this indicates that the throttle valve is in its idle position, or the accelerator pedal is completely released, and, therefore, a manual shift-down is demanded. Then, the an automatic line pressure control for manual shift-down is performed in steps S4 to S12.

In the automatic line pressure control for manual shift-down, after memorizing the most recent turbine speed Nt as a reference turbine speed Nts at the beginning of shift-down in the microcomputer of the automatic transmission control unit ATC at step S4, the duty rate percentage DR, at which the line pressure control duty solenoid valve 60 operates, is set to 0%. Since the line pressure control duty solenoid valve 60, operating at a 0% duty rate DR, raises the hydraulic pressure at the control port 59c of the modulator valve 59, the pilot pressure applied to the regulator valve 64 through the modulator valve 59 is raised, so as to raise the line pressure to a predetermined higher level. Due to the fact that the coast clutch means 23 is prevented from coupling quickly at the beginning of the manual shift-down by the operation of the coast timing valve 43 and, therefore, produces no shock during coupling, the rise of line pressure is permitted in order to accelerate the application of hydraulic pressure to the release port 26b of the 2-4 brake means 26. This allows the 2-4 brake means 26 to be released at an advanced timing and improves the responsiveness of shifting of the automatic transmission AT.

After reading the most recent turbine speed Nt at step S6, the rate of speed change (speed change rate) DNt of the turbine speed Nt relative to time is calculated at step S7. Thereafter, a decision is made at step S8 as to whether the speed change rate DNt is higher than zero (0). If the speed change rate DNt is not higher than zero, the speed change rate DNt is repeatedly calculated until it becomes higher than zero (0). As long as the speed change rate DNt is equal to or less than zero (0), the line pressure is kept at the predetermined level. That is, during a manual shift-down from the fourth speed gear (4th) to the third speed gear (3rd), the application of hydraulic pressure to the release port 26b of the 2-4 brake means 26 is commenced immediately after the start of the manual shift-down to loosen the 2-4 brake means 26 and allow the turbine 10 to decrease its speed Nt. The turbine 10 begins to increase its speed Nt immediately after the start of applying hydraulic pressure to the coast clutch means 23. Accordingly, because the coast clutch means 23 is not coupled before the turbine 10 begins to increase its speed Nt, the line pressure is kept increased in order to improve th responsibility in shifting of the automatic transmission AT.

When the speed change rate DNt of the turbine 10 becomes higher than zero (0), the duty rate DR of the duty solenoid valve 60 is changed to 100% so as to lower the hydraulic pressure at the control port 59c of the modulator valve 59. As a result, the pilot pressure for the regulator valve 64 drops to a predetermined lower level. Lowering the line pressure to the predetermined lower level is conducted in order to let the coast clutch 23 operate somewhat sluggishly at the beginning of coupling for the prevention of coupling shocks. After changing the duty rate DR to 100%, the most recent turbine speed Nt is read at step S10 and is, at step S11, compared with the reference turbine speed Nts memorized at step S4. The comparison of turbine speeds is repeated until the most recent turbine speed Nt becomes higher than the reference turbine speed Nts. During the comparison, the line pressure is kept at the predetermined lower level. This is because the line pressure must be high in order to increase the capacity of and positively couple the coast clutch 23 after the most recent turbine speed Nt becomes higher than the reference turbine speed Nts at the beginning of a down-shift. It is not necessary for the line pressure to be high before this time.

When the most recent turbine speed Nt actually becomes higher than the reference turbine speed Nts and a yes answer is provided to the decision at step S11, a manual down-shift line pressure control, in which the line pressure is controlled depending upon the difference between the turbine speeds Nt and Nts, is performed at step S12. In the manual down-shift line pressure control, the line pressure is gradually raised according to the difference between the most recent turbine speed Nt and the reference turbine speed Nts. The line pressure is raised as the engine increases its output torque during the shift of the automatic transmission AT to the third speed gear (3rd), so as to couple rapidly the coast clutch means 23 without causing shift shocks.

Figure 16:
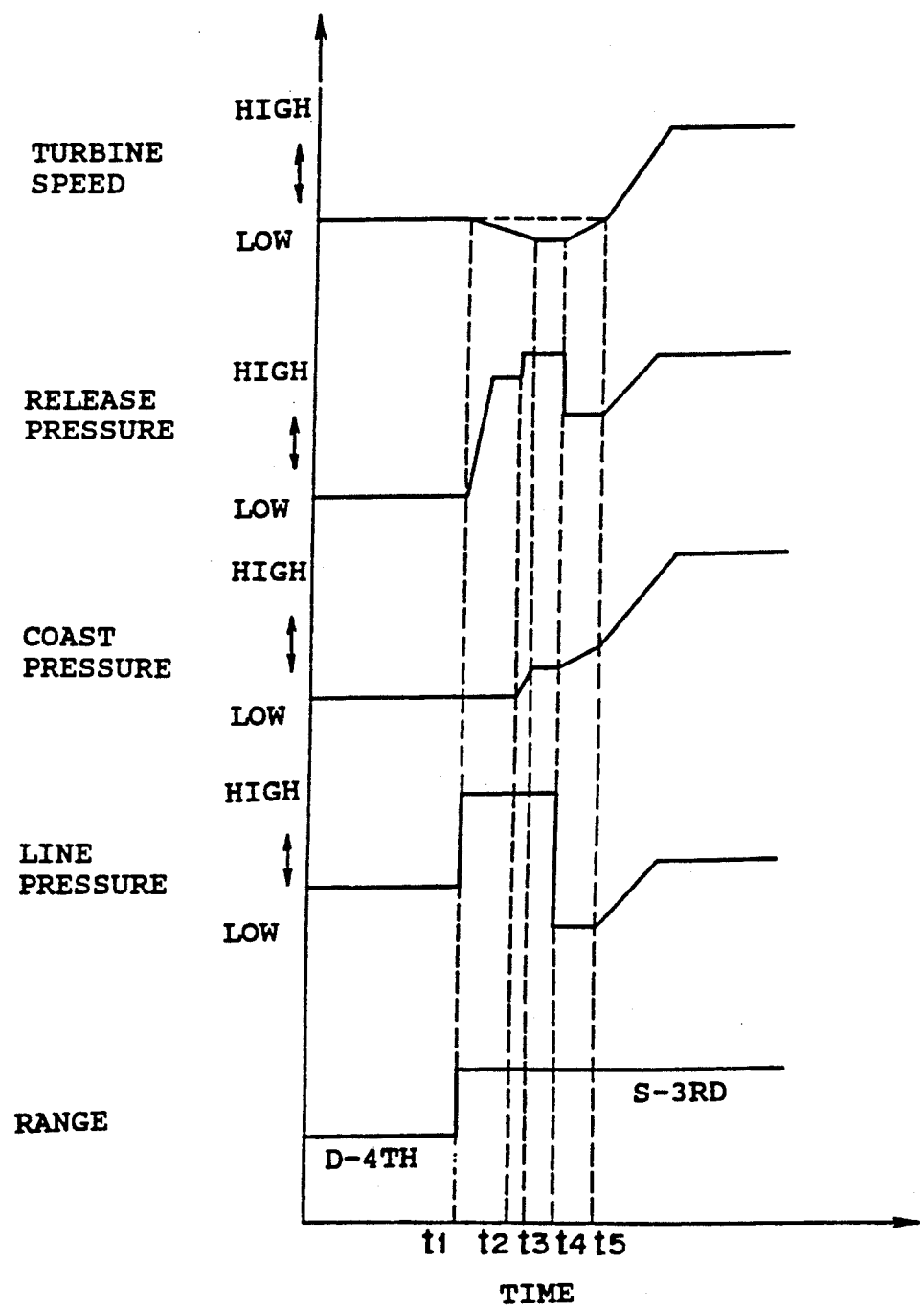
FIG. 16 is an explanatory time chart of the relationship among various pressures controlled by the hydraulic pressure control circuit of FIG. 12.

For enhancing an understanding of the operation of the automatic transmission line pressure control system according to the above embodiment of the present invention shown in FIGS. 1, 2, 11, 12A to 12D and 13, reference should be made to FIG. 16, which is a time chart showing changes of turbine speed, servo release pressure, coast pressure, line pressure and range selection for a specific example of a manual down-shift from the fourth speed gear (4th) in the drive range (D) to the third speed gear (3rd) in the second range (S).

When a manual shift-down from the fourth speed gear (4th) in the drive range (D) to the third speed gear (3rd) in the second range (S) is caused at a time t1 the turbine speed Nt begins to gradually drop at the time t1 and to gradually rise at a time t4. The turbine speed Nt reaches the reference turbine speed Nts at a time t5. During a change of turbine speed Nt, the line pressure rises to a predetermined higher level of, for example, 9 Kg/cm$^2$ at the time t1 and drops down to a lower predetermined level of, for example, 4 Kg/cm$^2$ which is lower than a pressure of, for example, 5 Kg/cm$^2$ before the manual shift-down. The line pressure again begins to raise gradually in the speed difference dependent line pressure control at the time t5. Although the release pressure developed at the release port 26b of the 2-4 brake means 26 begins immediately to rise at the time t1, the coast pressure for the coast clutch means 23 begins to raise at a second time t2, a little later than the time t1, due to the operation of the coast timing valve 43 and brings the coast clutch means 23 into coupling at a third time t3.

As is clear from the time chart in FIG. 16, the line pressure rises in the period defined between the times t1 and t5, in which there is no possibility for coupling shocks to be caused in the coast clutch 23, so as to raise the release pressure for the 2-4 brake means 26 in a short time and to cause the application of pressure to the coast clutch means 23 to commence quickly. This improves the responsiveness of the automatic transmission to shifting. The line pressure drops at the time t4, at which the turbine speed Nt begins to rise, so as to effectively prevent the coast clutch means 23 from causing coupling shocks. Because, after the time t5 at which the turbine speed Nt reaches the reference turbine speed Nts, the line pressure is controlled by the speed difference dependent line pressure control, the coast clutch 23 increases its clutch capacity according to the change of engine output torque and is, accordingly, quickly brought into coupling without causing coupling shocks. Because the line pressure rises in the period between the times t1 and t4, the drop of the turbine speed Nt is suppressed in this period and, therefore, the coast clutch means 23 is more effectively prevented from causing coupling shocks after this period.

Figure 17:
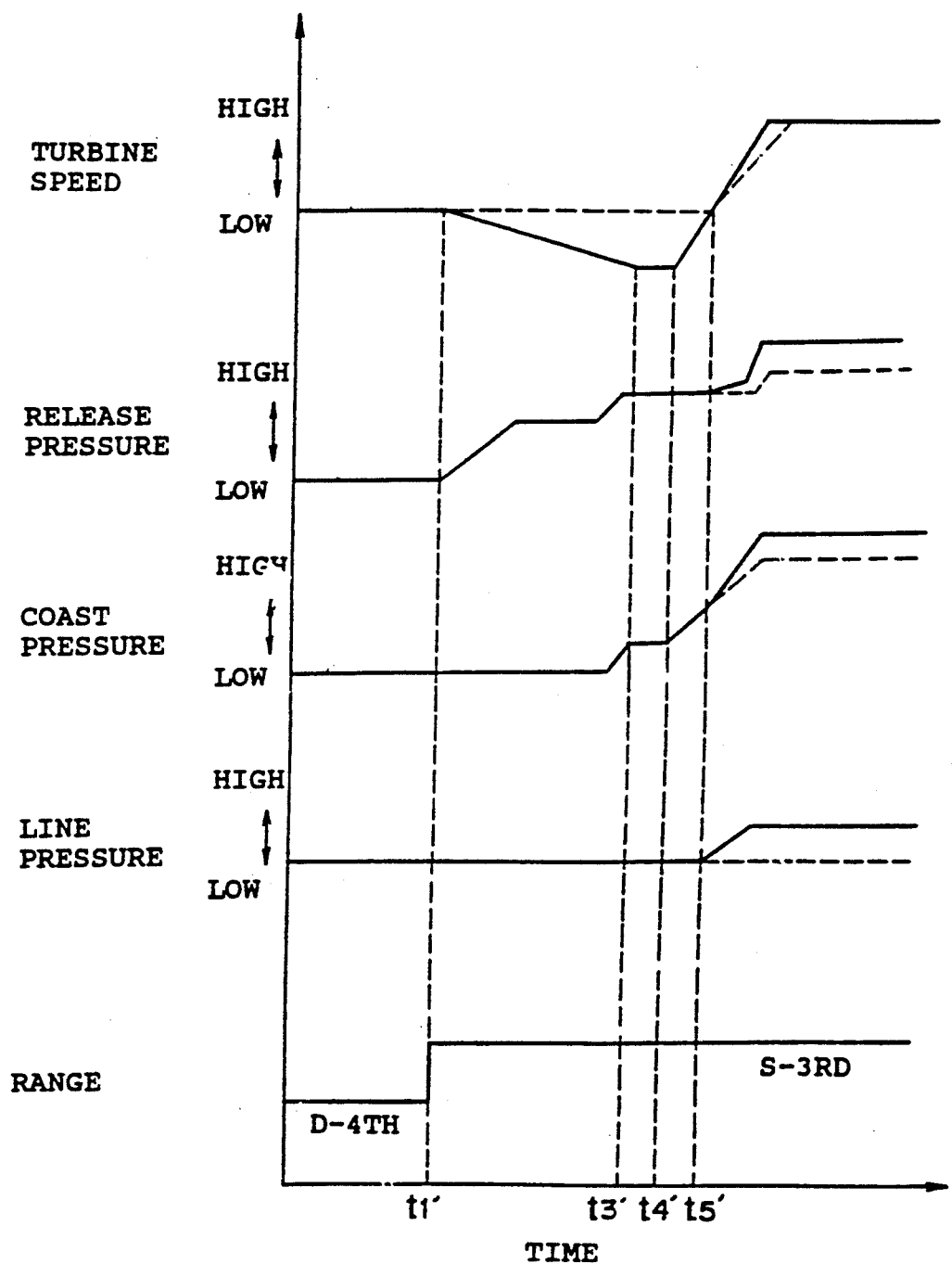
FIG. 17 is an explanatory time chart of the relationship among various pressures controlled by a prior art hydraulic pressure control circuit.

FIG. 17 is a time chart, similar to FIG. 15, showing changes of turbine speed, servo release pressure, coast pressure and line pressure for the conventional automatic transmission line pressure control system in which the line pressure is not raised from the beginning of a manual shift-down, which is defined between the times t1' and t4', and is not dropped during the rise of turbine speed between the times t4' and t5'. The conventional automatic transmission line pressure control system shows pressure changes depicted by solid lines in the case of performing the same speed difference dependent line pressure control as in the automatic transmission line pressure control system of the present invention or, otherwise, shows pressure changes depicted by dashed or chained lines when such a speed difference dependent line pressure control is not performed.

As is clear from FIG. 17, the conventional automatic transmission line pressure control system needs a long time between the time t1', at which a manual shift-down commences, and the time t4', at which the turbine speed begins to rise. This causes a deterioration in responsiveness to shifting of the automatic transmission. In addition, the drop of turbine speed is great in the long period between the times t1' and t4', and the coast clutch means 23 causes coupling shocks after the long period.

Figure 18:
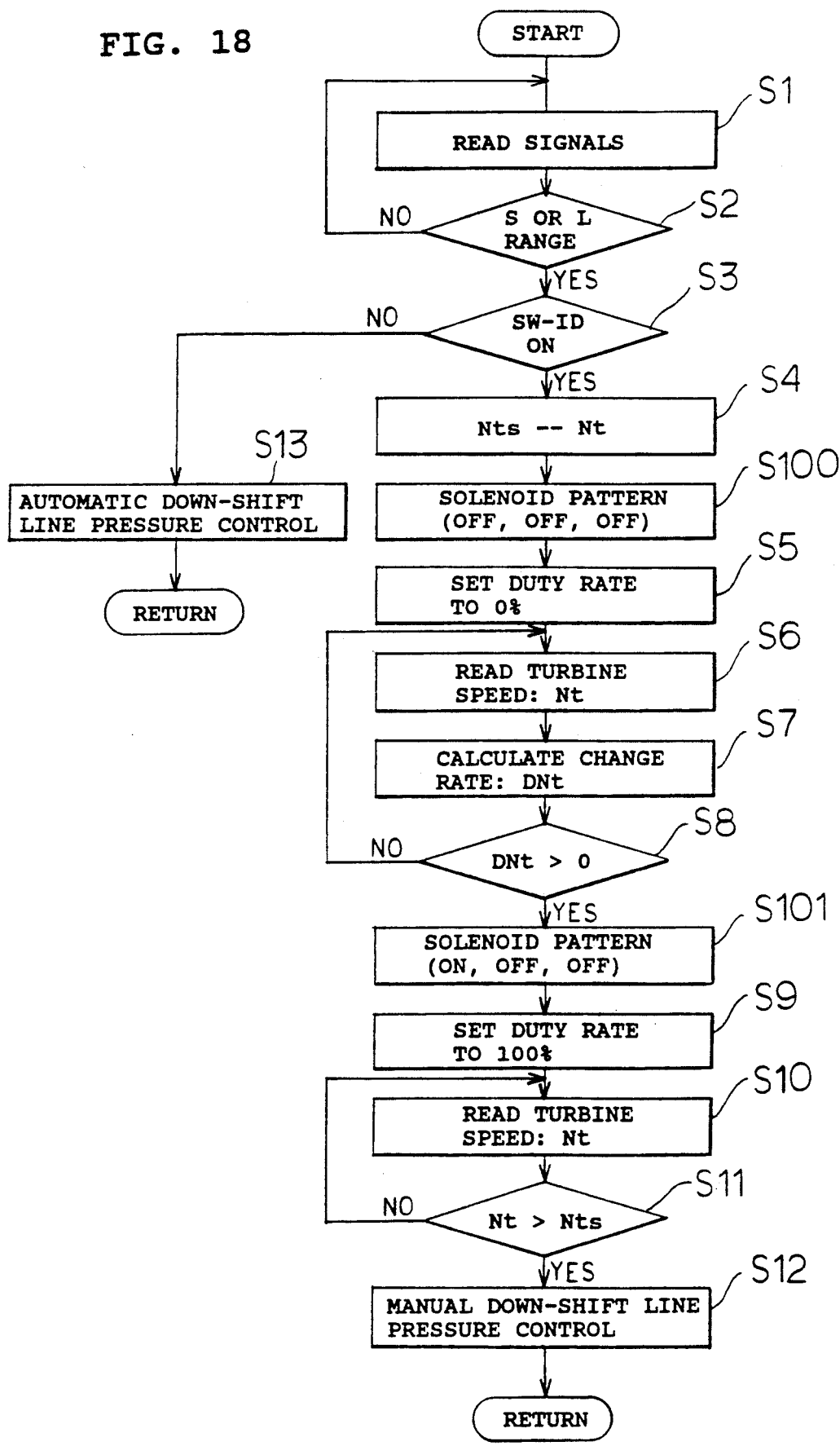
FIG. 18 is a flow chart illustrating a line pressure control sequence for a hydraulic pressure control circuit in accordance with a still another preferred embodiment of the present invention.

Referring to FIG. 18, a flow chart illustrating a line pressure control sequence of an automatic transmission line pressure control system in accordance with another preferred embodiment of the present invention is shown. This sequence controls the line pressure in the automatic transmission AT depicted in FIGS. 1, 2, 11, 12A to 12D and 13. Steps which are the same as the steps S1 to S13 of the line pressure control sequence of the automatic transmission line pressure control system shown in FIG. 14 are designated by the same reference numbers and are not described.

In this line pressure control sequence, there are two additional steps S100 and S101, between the steps S4 and S5 and between the steps S8 and S9, respectively, for changing valve operation patterns of the first to third solenoid valves 113, 115 and 117 for the shift valves 33 to 35. That is, the first to third solenoid valves 113, 115 and 117 are, all at step S100, de-energized or turned off and, at step S101, turned on, off and off, respectively.

This valve operation pattern, wherein each of the first to third solenoid valves 113, 115 and 117 are de-energized or turned off at step S100, is different from a valve operation pattern for the third speed gear (3rd) in the second range (S), wherein the first to third solenoid valves 113, 115 and 117 are turned on, off and off, respectively. The 1-2 shift valve 33 shifts into the on-state. The de-energization or turn off of the first solenoid valve 113 causes the hydraulic pressure in the first control-pressure line 112 connected to the 1-2 shift valve 33 to be applied to the control port 92s of the cut-back valve 92 through the pressure line 135, so as to stop the cut-back operation of the cut-back valve 92. Consequently, the hydraulic pressure in the pilot pressure line 62, and hence the pilot pressure for the regulator valve 64, rises so as to increase the line pressure by a factor of approximately 1.5. Due to the rise of the line pressure, the hydraulic pressure is more forcibly applied to the release port 26b of the 2-4 brake means 26. This forces the coast timing valve 43 to operate in a shortened time period so as to communicate the inlet and outlet ports 43a and 43b with each other, thereby applying the hydraulic pressure more quickly to the coast clutch 23.

The shift of the 1-2 shift valve 33 into the on-state allows the hydraulic pressure in the apply port 26a of the 2-4 brake means 26, so that the 2-4 brake means 26 is rapidly released by the hydraulic pressure in the release port 26b. Consequently, the application of hydraulic pressure to the coast clutch 23 is accelerated, which, in combination with the rise of the line pressure, shortens the time spent before the application of hydraulic pressure to the coast clutch 23. As a result, the automatic transmission AT is improved in responsiveness to shifting. The first to third solenoid valves 113, 115 and 117 thus changed in operation are forced to change to the valve operation pattern ordinary for the third speed gear (3rd) in the second range (S), wherein the first to third solenoid valves 113, 115 and 117 are turned on, off and off, respectively.

Figure 19:
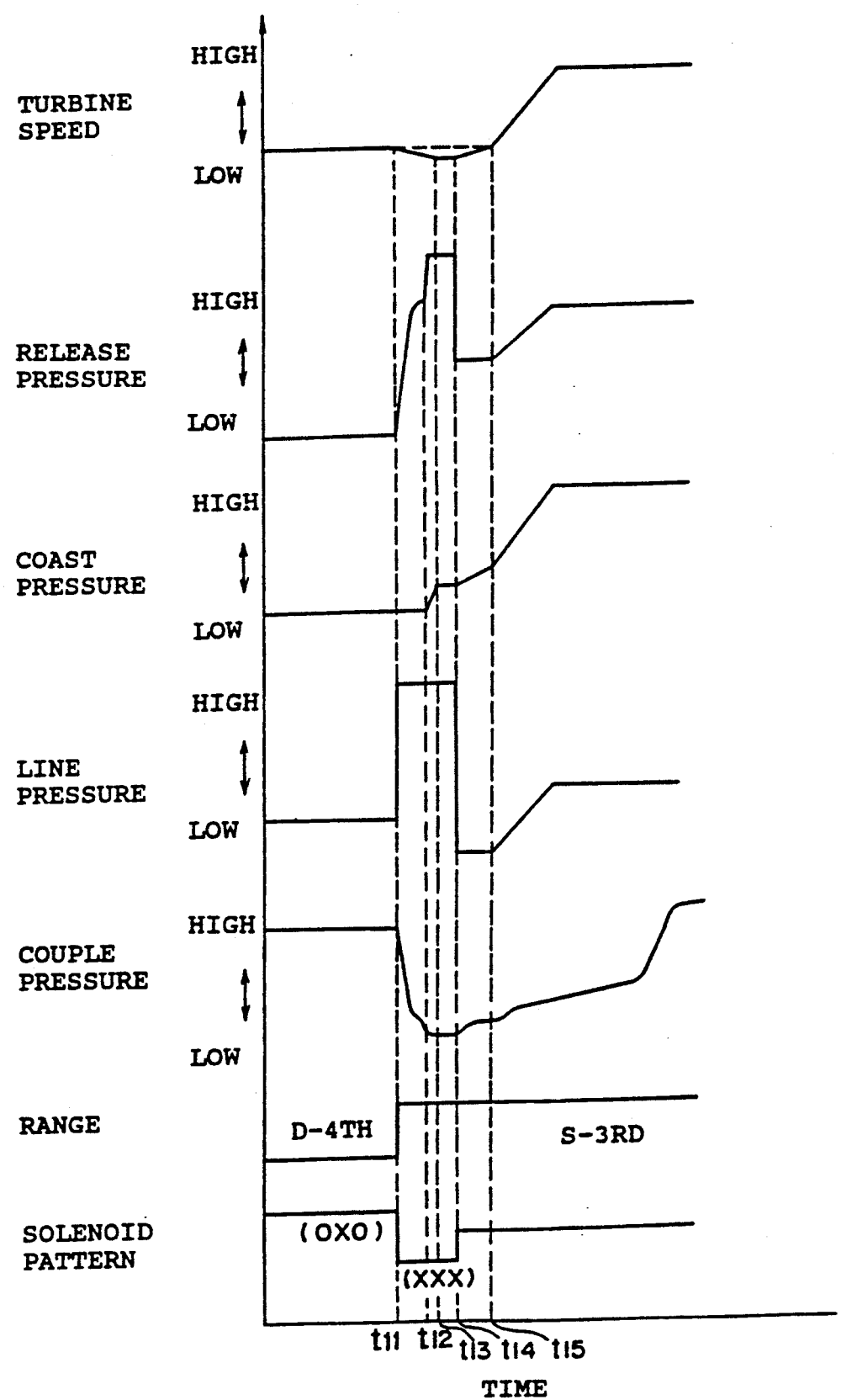
FIG. 19 is an explanatory time chart of the relationship among various pressures controlled by the line pressure control sequence of FIG. 18.

FIG. 19 is a time chart, similar to FIG. 15, showing changes of turbine speed, servo release pressure, coast pressure, line pressure, servo apply pressure, shift range and valve operation pattern for a specific example of a manual down-shift from the fourth speed gear (4th) in the drive range (D) to the third speed gear (3rd) in the second range (S).

As is clear from FIG. 18, the line pressure of the control system rises at the beginning of a shift-down, which is defined between a time t11, at which the shift-down starts, and a time t14, at which the turbine speed begins to raise greatly, to a value higher than that in the control system of any previous embodiment. For example, the pressure may rise to a pressure of approximately 12 Kg/cm$^2$. In addition, the line pressure control system shown in FIG. 18 shortens the time necessary for the beginning of a shift-down greatly. Such results in improving considerably the responsiveness of the automatic transmission AT to shifting.

It is to be understood that although the present invention has been described in detail with respect to preferred embodiments thereof, various other embodiments and variants may occur to those skilled in the art which fall within the scope and spirit of the invention. Such other embodiments and variants are intended to be covered by the following claims.

What is claimed is:

1. An automatic transmission line pressure control system for controlling line pressure in an automatic transmission equipped with a torque convertor for hydraulically coupling and un-coupling friction coupling elements so as to shift the automatic transmission into desired speed gears, said automatic transmission line pressure control system comprising:

line pressure regulating means for regulating line pressure to the friction coupling elements;
shift-down sensor means for detecting an occurrence of a manual shift-down;
speed sensor means for detecting a rotational speed transmitted to the automatic transmission;
control means for causing, when said shift-down sensor means detects an occurrence of a manual shift-down, said line pressure regulating means to forcibly drop the line pressure to a level lower than a level before the occurrence of a manual shift-down operation and then causing, as said speed sensor means detects an increase in said rotational speed, said line pressure regulating means to raise the line pressure.

2. An automatic transmission line pressure control system as recited in claim 1, further comprising friction coupling means for effecting engine braking when hydraulically coupled and hydraulic control means for coupling said friction coupling means with the line pressure, with a predetermined time delay, after said shift-down sensor means detects an occurrence of a manual shift-down.

3. An automatic transmission line pressure control system as recited in claim 1, wherein said control means causes said line pressure regulating means to raise the line pressure according to the difference between an actual rotational speed of a turbine of said torque converter and a rotational speed of the turbine at the beginning of a manual shift-down.

4. An automatic transmission line pressure control system as recited in claim 1, wherein said speed sensor means detects a rotational speed of a turbine of the torque converter.

5. An automatic transmission line pressure control system as recited in claim 1, wherein said shift-down sensor means comprises a position sensor for detecting operated positions of a manual shift lever.

6. An automatic transmission line pressure control system for controlling line pressure in an automatic transmission for hydraulically coupling and un-coupling friction coupling elements so as to shift the automatic transmission into desired ranges and speed gears, said automatic transmission line pressure control system comprising:

line pressure regulating means for regulating line pressure to the friction coupling elements;
shift-down sensor means for detecting an occurrence of a manual shift-down operation;
control means for causing, when said shift-down sensor means detects an occurrence of a manual shift-down, said line pressure regulating means to forcibly raise the line pressure at the beginning of said occurrence of a manual shift-down, to forcibly drop the line pressure, and then to raise again the line pressure gradually.

7. An automatic transmission line pressure control system as recited in claim 6, further comprising speed sensor means for detecting a rotational speed transmitted to the automatic transmission, said control means causing said line pressure regulating means, after said line pressure is forcibly raised, to forcibly drop the line pressure when said speed sensor means begins to detect an increase in said rotational speed.

8. An automatic transmission line pressure control system as recited in claim 7, wherein said control means causes, after said line pressure is forcibly dropped, said line pressure regulating means to raise again the line pressure in such a way that a rise of the line pressure is started when said speed sensor means detects that an actual rotational speed transmitted to the automatic transmission has reached a rotational speed transmitted to the automatic transmission at the beginning of said occurrence of a manual shift-down and corresponds to the difference between an actual rotational speed transmitted to the automatic transmission and a rotational speed transmitted to the automatic transmission at the beginning of a manual shift-down.

9. An automatic transmission line pressure control system as recited in claim 8, further comprising coast clutch means and frictional coupling means, said frictional coupling means being hydraulically uncoupled when said coast clutch means is hydraulically coupled.

10. An automatic transmission line pressure control system as recited in claim 9, further comprising coast timing valve means for bringing said coast clutch means into coupling in response to an uncoupling of said friction coupling means.

* * * * *